United States Patent [19]
Crews et al.

[11] Patent Number: 5,295,700
[45] Date of Patent: Mar. 22, 1994

[54] WORKPIECE SUPPORT ASSEMBLY FOR MICROROBOTIC APPARATUS

[75] Inventors: Daniel F. Crews, Winfield; Gregory R. O'Brien, Villa Park; Alan L. Stone, Wauconda, all of Ill.

[73] Assignee: Dukane Corporation, St. Charles, Ill.

[21] Appl. No.: 870,056

[22] Filed: Apr. 16, 1992

[51] Int. Cl.⁵ .............................. B23B 5/22; B23B 5/34
[52] U.S. Cl. ............................................ 279/5; 279/137
[58] Field of Search ............... 279/4.04, 4.08, 5, 51, 279/127, 137

[56] References Cited

U.S. PATENT DOCUMENTS

| | | | |
|---|---|---|---|
| 2,842,370 | 7/1958 | Kuba | 279/137 X |
| 3,594,537 | 7/1971 | Morgengy | 279/5 X |
| 4,854,667 | 8/1989 | Ebata et al. | |

FOREIGN PATENT DOCUMENTS

| | | | |
|---|---|---|---|
| 753553 | 8/1980 | U.S.S.R. | 279/5 |
| 1052346 | 11/1983 | U.S.S.R. | 279/127 |

*Primary Examiner*—Timothy V. Eley
*Attorney, Agent, or Firm*—Emrich & Dithmar

[57] ABSTRACT

A compliant workpiece support assembly for a microrobotic apparatus for aligning three workpieces and welding them into an assembled package, includes a lower support assembly having a ball and socket joint with a polymer ball seat cast around the ball. The ball has a radial bore containing a lower collet axially movable in the bore to grip one of the workpieces. The other two workpieces are held in telescoping arrangement, respectively in inner and outer collets of an upper support assembly, the collets being disposed coaxially one within the other and respectively having camming housings for opening and closing the collets. The outer collet housing supports the entire upper support assembly and is axially driven so that when the outer collet bottoms on the outer workpiece the continued movement of the outer housing closes the collet to grip the workpiece. The inner collet is closed over the inner workpiece by a pneumatic piston. When the upper support assembly is lowered over the lower support assembly to bring the workpieces together, the force drives the lower collet into the ball to close the collet over the lower workpiece. Pneumatic clamps are provided for locking the lower collet closed and for locking the ball against rotation. A pneumatic clamp floats on the upper support assembly to lock the outer collet closed. The inner collet assembly is movable axially relative to the outer collet assembly for axial adjustment of the positions of the two upper workpieces relative to each other.

32 Claims, 12 Drawing Sheets

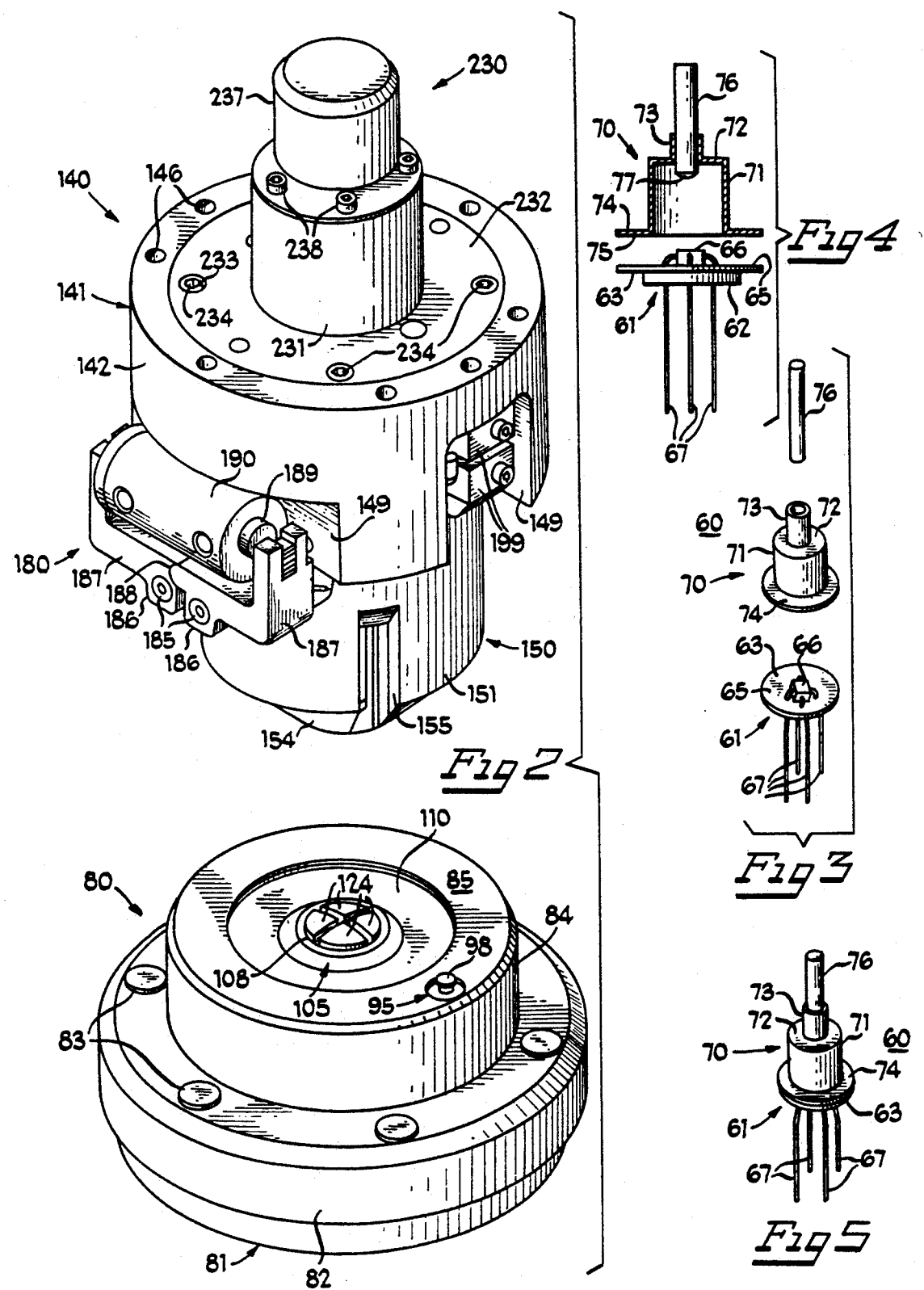

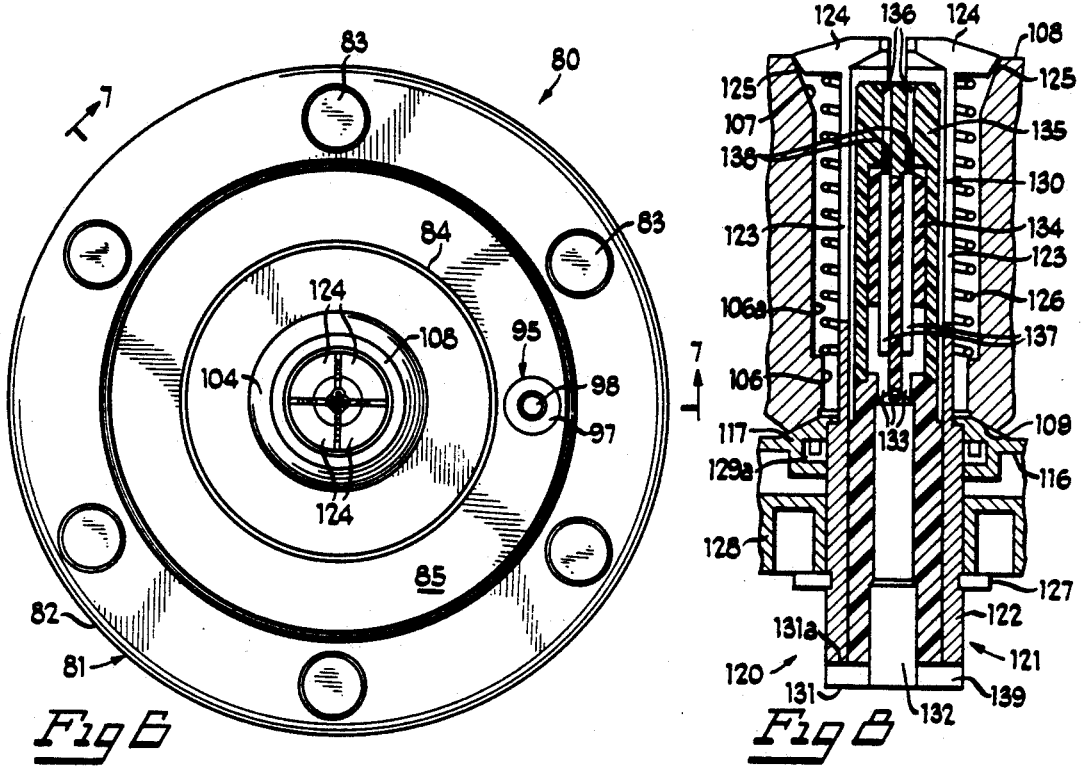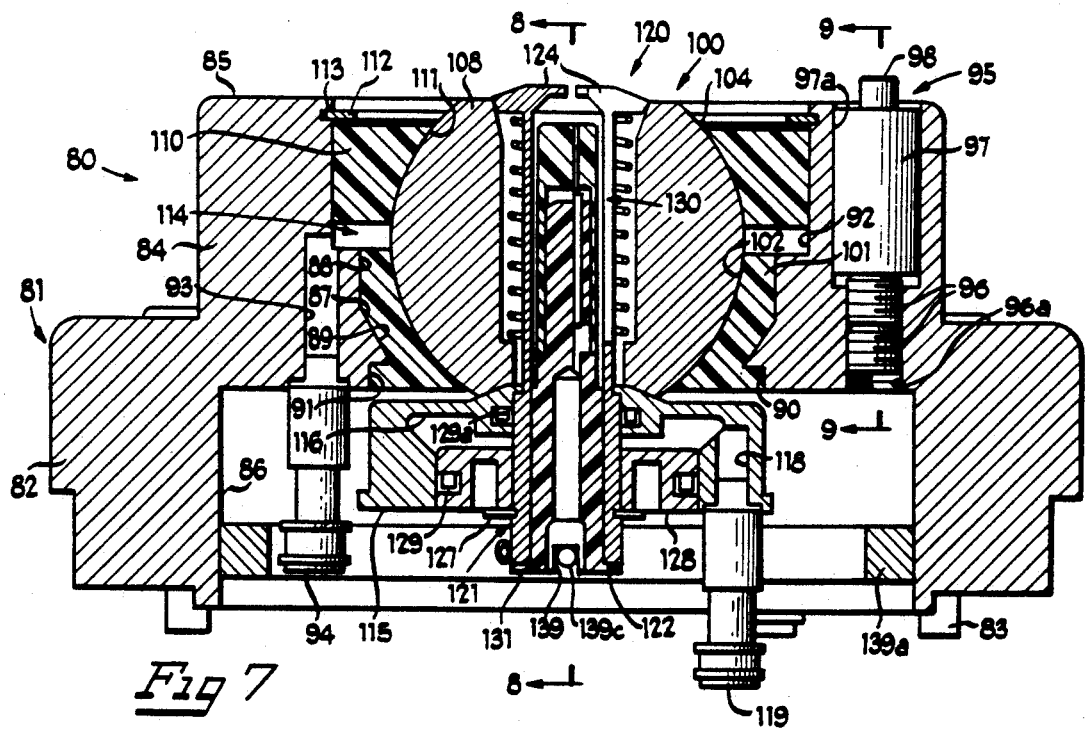

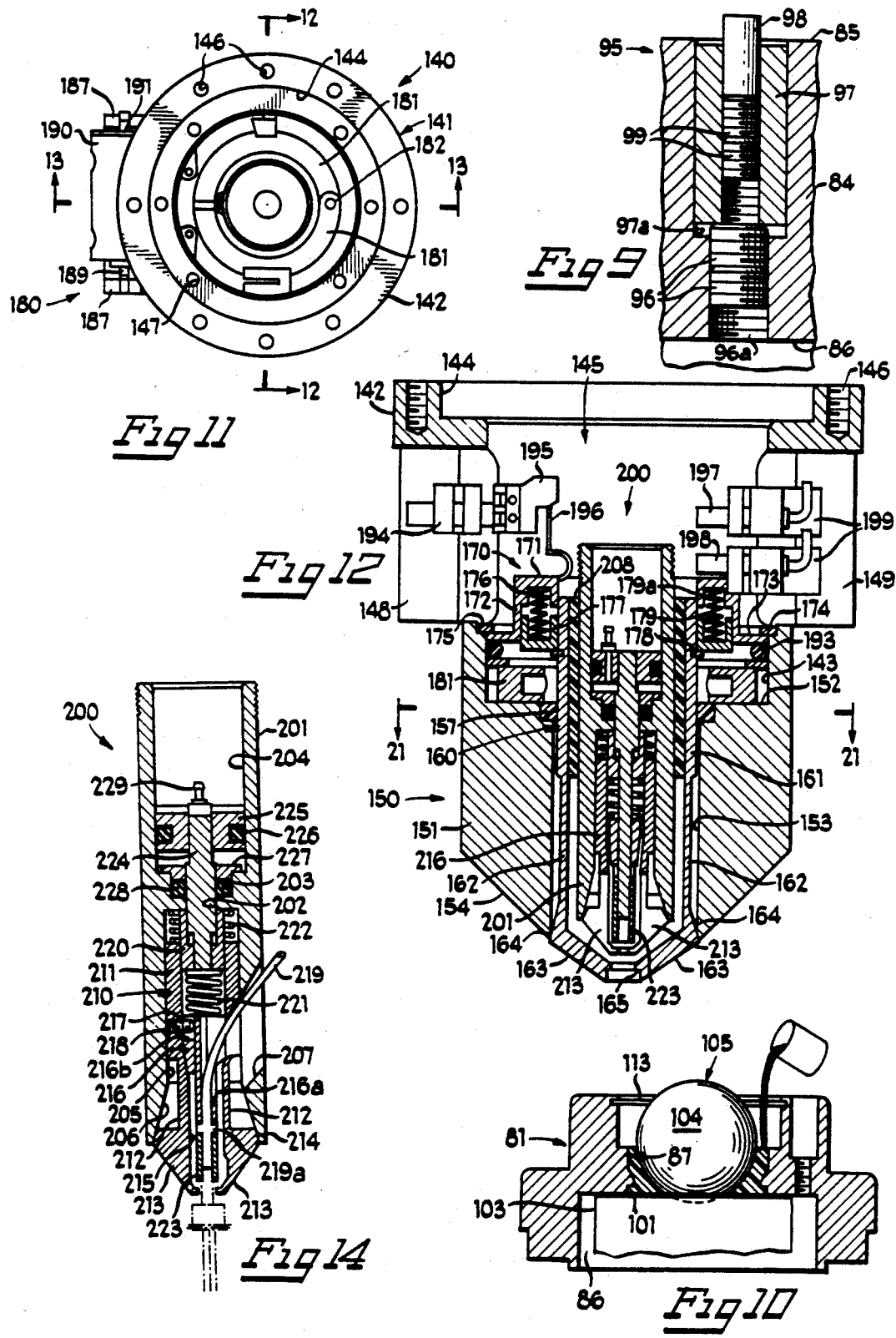

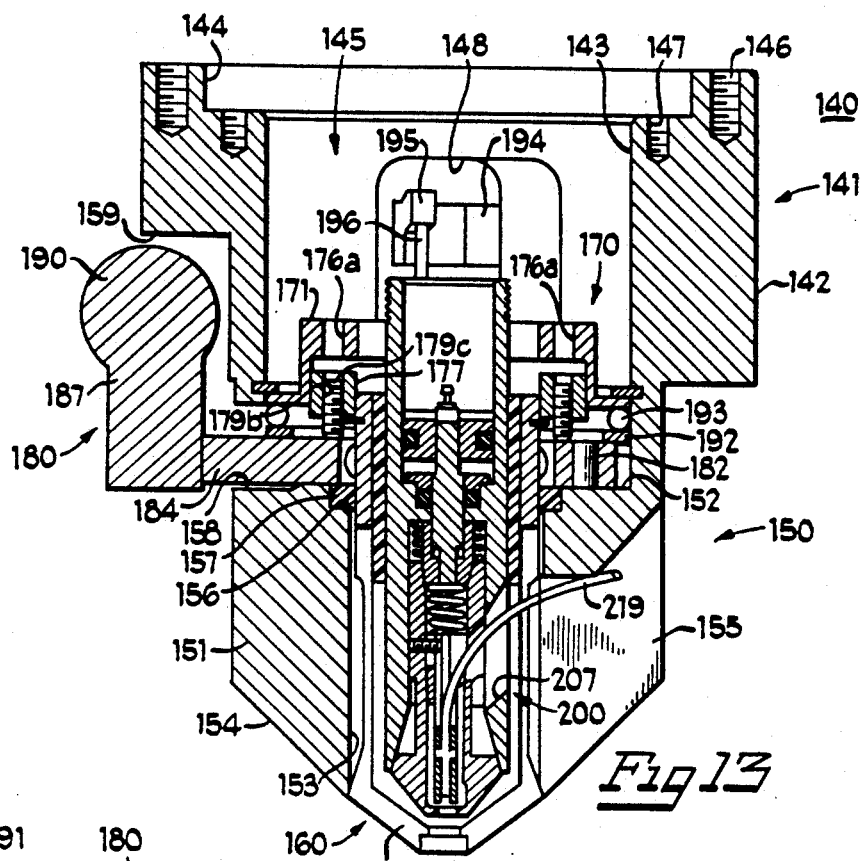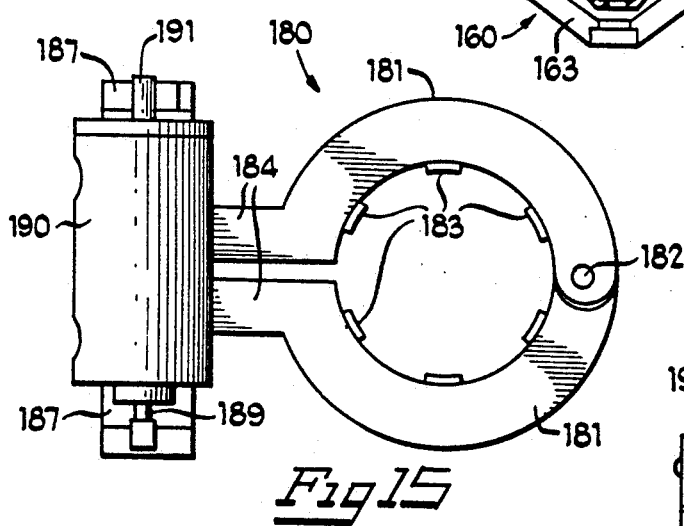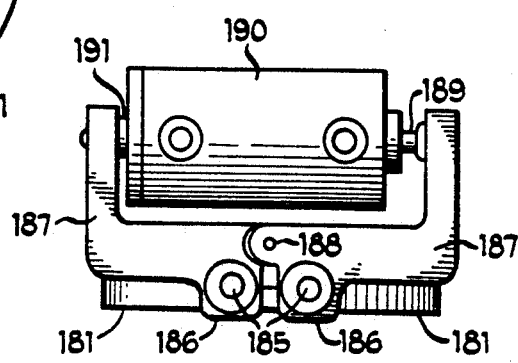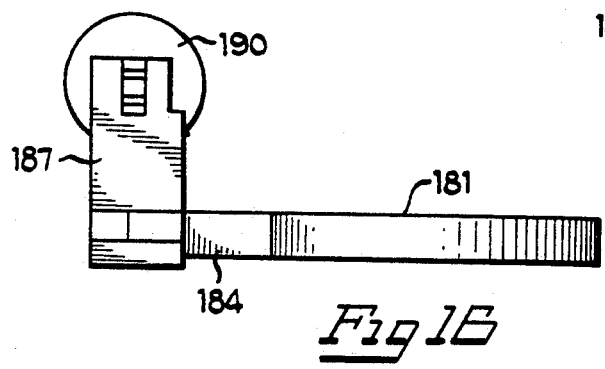

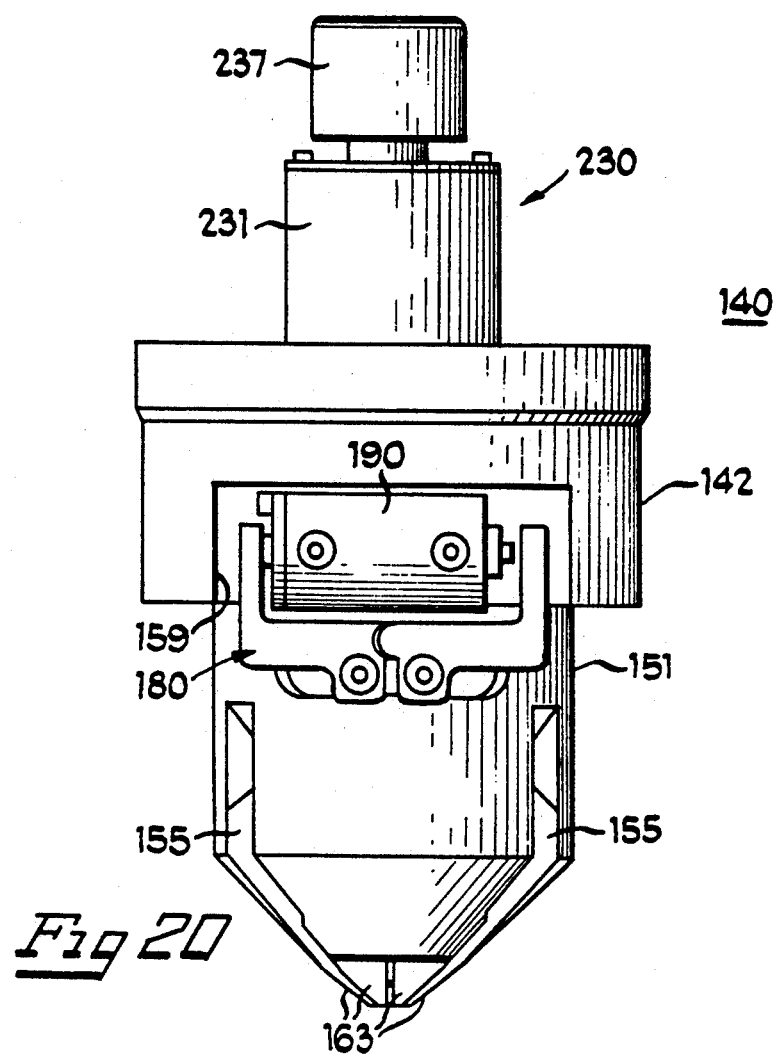
_Fig 20_
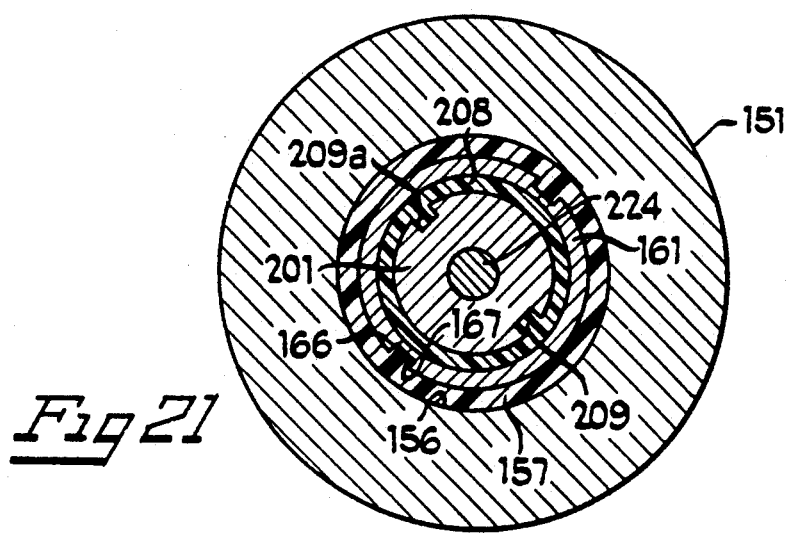
_Fig 21_

WORKPIECE SUPPORT ASSEMBLY FOR MICROROBOTIC APPARATUS

BACKGROUND OF THE INVENTION

1. Field of the Invention

This invention relates to coupling assemblies and, specifically, to microminiature coupling assemblies designed to align and join together the component parts of an optoelectronic package or module. The invention relates particularly to microrobotic devices for very high precision alignment and positioning of the parts of the module.

2. Description of the Prior Art

In the manufacture of optoelectronic modules, such as laser diode packages, it is essential that the light source or laser diode portion and the light receiving optics portion be carefully aligned with each other to optimize light coupling between the two portions. Thus, in the assembly of the parts, a coupling position must be arrived at and maintained with very high precision, typically in the sub-micron range, to ensure optimal light coupling. Various types of alignment apparatuses have been provided to adjust the positions of optoelectronic parts relative to one another so as to assure optimum alignment. However, it has been extremely difficult to maintain this alignment while the parts are joined together to complete the package or module.

One type of package or module may include a base or header portion and a cap portion, each of which is provided with an annular flange defining a planar surface, the planar surfaces of the two flanges being brought together in face-to-face abutting relationship to join the parts together, such as by laser welding. During the welding operation, it is extremely important that the two surfaces that are going to be welded be virtually coplanar, i.e., that they be in contact and parallel within zero to five microns. The surfaces may be held out of parallelism by more than five microns by minute imperfections in the surfaces themselves, by air gaps therebetween and the like. If they are the slightest bit out of parallelism when welded, the welding operation will tend to draw them together to eliminate any gaps or imperfections and thereby destroy the pre-welding alignment which had been achieved. Such minute misalignments can sometimes be corrected, such as by remedial weld applications, but such techniques are time consuming and expensive and, if they fail, the result is a worthless module. This may result in considerable waste, since the components of the package or module themselves can be quite expensive to manufacture.

Minute imperfections and air gaps between the mating surfaces can be eliminated by pressing the surfaces together with sufficient force, but if the parts are not in essentially perfect parallelism before application of the force, it may distort or deform the surfaces, which may itself result in misalignment of the parts or damage thereto.

While a number of systems are known to provide accurate positioning of parts in an X-Y plane, it is sometimes necessary to position parts along the Z axis also. This may occur, for example, in the case of a three-part assembly, wherein two of the parts must be precisely positioned relative to each other along the Z axis and those combined parts must then be precisely positioned relative to a third part along X and Y axes. There is a need for apparatus which can effectively handle and adjust the alignment of parts in all three axes simultaneously prior to joinder of the parts.

SUMMARY OF THE INVENTION

It is a general object of the invention to provide an apparatus for accurately aligning and position parts of an assembly with extremely high precision, which avoids the disadvantages of prior apparatuses, while affording additional structural and operating advantages.

An important feature of the invention is the provision of a compliant mounting for a workpiece which will essentially self-align the workpiece in response to the application of force thereto.

In connection with the foregoing feature, another feature of the invention is the provision of an apparatus of the type set forth which is of relatively simple and economical construction.

Another feature of the invention is the provision of a method for forming a compliant mounting of the type set forth.

Another feature of the invention is the provision of an apparatus for simultaneously holding two telescoping workpieces and maintaining them in coaxial alignment.

In connection with the foregoing feature, another feature of the invention is the provision of an apparatus of the type set forth, which permits axial adjustment of the parts relative to each other.

Still another feature of the invention is the provision of an apparatus of the type set forth, which provides for simultaneous handling of three parts of an assembly.

Another feature of the invention is the provision of an apparatus of the type set forth which permits two planar surfaces to be moved together into a virtually coplanar condition.

In connection with the foregoing feature, it is a still further feature of the invention to provide an apparatus of the type set forth, which is responsive to a force urging the parts together for automatically aligning them to a parallel condition.

Certain of these and other features of the invention are attained by providing apparatus for aligning a workpiece along an axis with respect to which it may be slightly misaligned, comprising: a ball member, fixture means carried by the ball member for holding the workpiece aligned along a radius of the ball member, socket means seating the ball member with its center on the axis for free universal rotational movement about the center, and aligning means movable along the axis for engagement with the workpiece to move it into alignment with the axis, the ball member cooperating with the socket means for accommodating the aligning movement of the workpiece in response to engagement by the aligning means.

Other features of the invention are attained by providing apparatus for grasping coaxially telescoping inner and outer objects and moving them axially relative to each other, comprising: an outer collet assembly including an outer sleeve and an outer collet coaxially received within the outer sleeve and dimensioned for receiving and grasping the outer object, first drive means for effecting relative axial movement of the outer collet and the outer sleeve for moving the outer collet between open and closed conditions relative to the outer object, an inner collet assembly disposed coaxially within the outer collet and including an inner sleeve and an inner collet coaxially received within the inner sleeve and dimensioned for receiving and grasping the inner object, second drive means for effecting relative axial movement of the inner collet and the inner sleeve for moving the inner collet between open and closed conditions relative to the inner object, and third drive means for effecting axial movement of the inner collet assembly relative to the outer collet assembly.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its and operation, and many of its advantages readily understood and appreciated.

FIG. 2 is an enlarged, perspective view of the upper and lower assemblies of FIG. 1;

FIG. 3 is an exploded, perspective view of three workpieces to be assembled into a package or module by the system of FIG. 1;

FIG. 4 is an enlarged, side elevational view of the workpieces of FIG. 3, partially assembled and partially in vertical section;

FIG. 5 is a perspective view of the workpieces of FIG. 3 fully assembled into a package;

FIG. 6 is a further enlarged top plan view of the lower workpiece support assembly of FIG. 2;

FIG. 7 is a further enlarged view in vertical section taken along the line 7—7 in FIG. 6;

FIG. 8 is a further enlarged, fragmentary view in vertical section taken along the line 8—8 in FIG. 7;

FIG. 9 is a further enlarged, fragmentary view in vertical section taken along the line 9—9 in FIG. 7;

FIG. 10 is a reduced view in vertical section illustrating the method of forming the ball seat of the support assembly of FIG. 7;

FIG. 11 is a reduced top plan view of the upper workpiece support assembly of FIG. 2, rotated about 45° counterclockwise, and with the drive assembly removed;

FIG. 12 is an enlarged view in vertical section taken along the line 12—12 in FIG. 11;

FIG. 13 is an enlarged view in vertical section taken along the line 13—13 in FIG. 11;

FIG. 14 is a further enlarged fragmentary view in vertical section of the inner collet assembly of the upper workpiece support assembly of FIGS. 12 and 13;

FIG. 15 is an enlarged top plan view of the outer collet clamp assembly workpiece support assembly of FIG. 11;

FIG. 16 is a side elevational view of the clamp assembly of FIG. 15;

FIG. 17 is an end elevational view of the clamp assembly of FIG. 15, as viewed from the left-end thereof;

FIG. 20 is a reduced front elevational view of the upper workpiece support assembly of FIG. 2;

FIG. 21 is a view in horizontal section taken along the line 21—21 in FIG. 12;

DESCRIPTION OF THE PREFERRED EMBODIMENT

Figure 1:
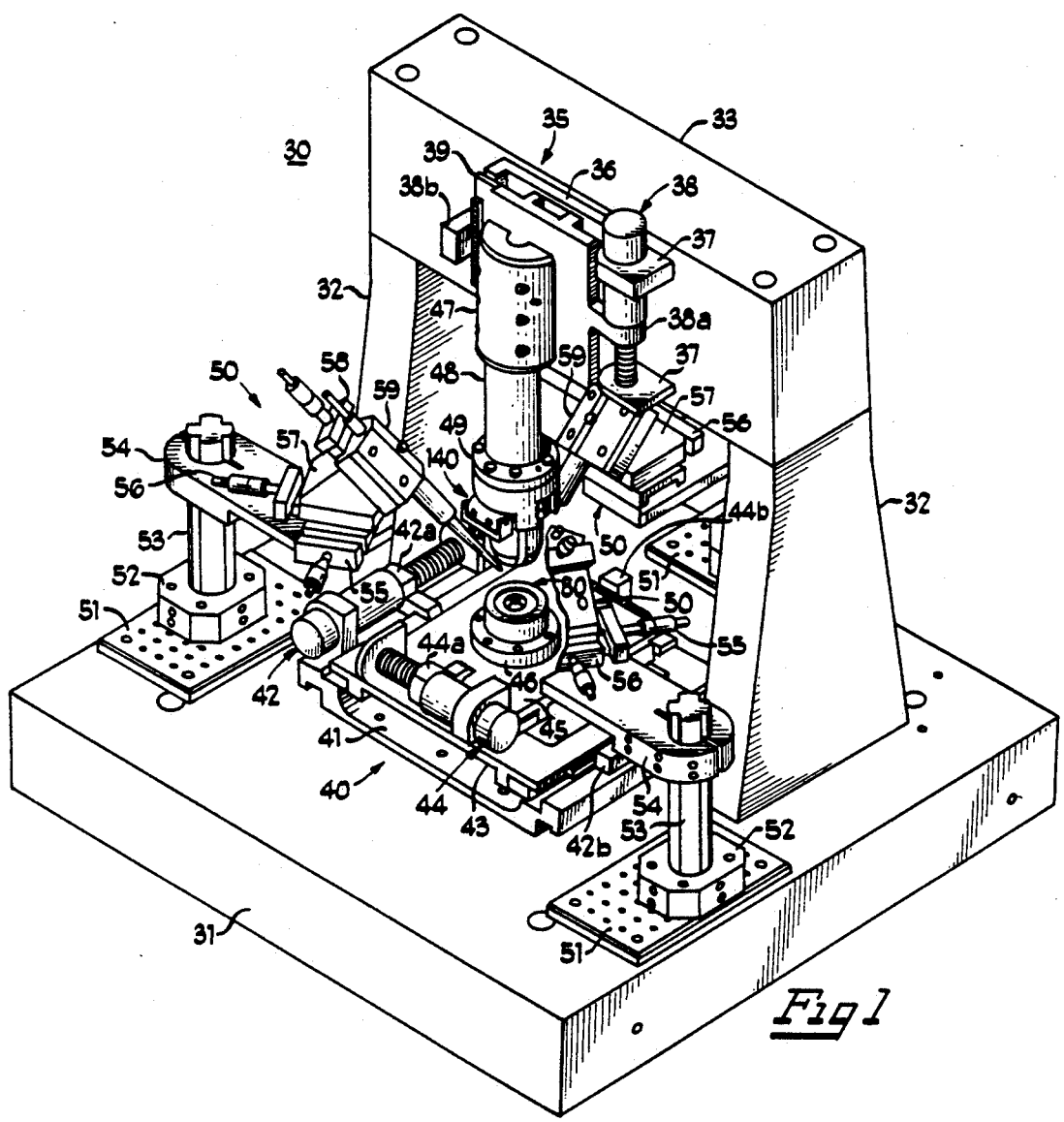
FIG. 1 is an isometric view of a microrobotic alignment and welding system incorporating the workpiece support assemblies of the present invention, with a portion broken away more show the structure of the invention.

Referring now to FIG. 1, there is illustrated a microrobotic alignment welding system, generally designated by the numeral 30, with which the present invention is designed to be used. The microrobotic system 30 is designed to provide rigid, vibration-resistant, high-precision positioning of workpieces with a repeatability of ±0.1 micron. To this end, the microrobotic system 30 includes a very high mass granite base 31, which is preferably supported on pneumatic isolation pads (not shown). Mounted on the base 31 are a pair of upstanding granite risers 32 supporting a granite beam 33. Mounted on the front of the beam 33 is a Z-axis assembly 35, including a base plate 36 fixed to the beam 33 and having upper and lower brackets 37 which support a Z-axis drive mechanism 38, which includes a DC motor directly connected to a ball screw and nut assembly, the nut 38a being connected to a movable plate 39 for effecting vertical or Z-axis movement thereof relative to the base plate 36. A linear encoder 38b is disposed for detecting and quantizing the movements of the plate 39.

Mounted on the base 31 between the risers 32 and extending forwardly thereof is an X-Y axes assembly 40 for providing adjustments in the X-Y plane, which is perpendicular to the Z axis and is, in this case, a horizontal plane. The assembly 40 includes a base plate 41 which is fixed to the base 31 and carries along one side thereof a Y-axis drive mechanism 42, which is substantially identical to the Z-axis drive mechanism 38 and includes a nut 42a fixed to a movable plate 43 which is supported on the base plate 41, for effecting horizontal movement of the plate 43 in the Y or front-to-back direction. The movable plate 43 carries along its front edge an X-axis drive mechanism 44, which is substantially identical to the Y-axis mechanism 42 and includes a nut 44a, which is fixed to a plate or table 45 carried by the movable plate 43 for movement with respect thereto in the X or left-to-right direction. Linear encoders 42b and 44b, respectively, detect and quantize the movements of the plates 43 and 45. Carried by the table 45 and recessed therewithin is a rotary drive 46 for effecting rotational movement of a supported part about a vertical axis. Fixedly secured to the front surface of the Z-axis movable plate 39 is a semi-cylindrical coupling bracket 47 having a depending, reduced-diameter extension 48 which is cut away at the rear end thereof and is provided at its lower end with a radially outwardly extending annular attachment flange 49 for a purpose to be described below.

It will be appreciated that the X, Y and Z axes are set up to be perfectly orthogonal. While the Z axis is disclosed as vertical, it will be appreciated that the principles of the present invention can be applied to systems having different orientations for the Z axis.

Also mounted on the base 31 are three substantially identical Nd:YAG laser welding assemblies 50, angularly spaced apart at about 120° intervals around the rotational axis of the rotary drive 46 and radially substantially equidistant therefrom. Each of the welding assemblies 50 includes a flat rectangular mounting plate 51 fixed to the granite base 31 and provided with a plurality of mounting holes arranged in a grid to permit mounting thereon, in a selected position of, a pedestal 52 for an upstanding post 53. Secured to each post 53 adjacent to its upper end is an arm 54 which projects inwardly toward the X-Y axes assembly 40. Each arm 54 has mounted thereon overlapping micrometer x- and y-axis stages 55 and 56 for precise adjustments in orthogonal x and y directions which preferably define a substantially horizontal plane. Fixed to each y-axis stage 56 is a 45° wedge 57, on which is mounted a micrometer z-axis stage 58 for adjustment along a z-axis inclined at 45° to the horizontal. Supported on each z-axis stage 58 is a laser tube assembly 59 which is coupled by a suitable fiber optic cable (not shown) to a Nd:YAG laser beam source, described more fully below. In use, the x- and y-axis stages are used to aim the laser beam at the workpieces, while the z-axis stage is used to focus the beam on the workpieces, all in a known manner.

It will be appreciated that the arrangement of the welding assemblies 50 is specific to the particular application disclosed herein and that, for other applications, other arrangements could be used. Thus, different numbers of welding assemblies could be provided and different support arrangements 51-54 could be provided for each welding assembly. Adjustment along four axes could be provided as could different tilt angles.

Referring now also to FIGS. 3-5A, there is illustrated an optoelectronic package or module 60 of the type which can be assembled using the system 30. The package 60 comprises three pieces, viz., a header 61, a cap 70 and an optics tube 76. These parts are illustrated disassembled in FIG. 3, partially assembled in FIG. 4 and fully assembled in FIG. 5. The header 61 includes a cylindrical body 62 integral at its upper end with a larger diameter circular disc 63, which has a flat, planar upper joinder surface 65. A laser diode 66 is mounted in the body 62 and projects a slight distance above the surface 65 centrally thereof, the diode 66 being provided with four elongated leads 67 which project vertically downwardly from the body 62. The cap 70 has a cylindrical side wall 71 integral at its upper end with an annular end wall 72, provided with an upstanding axial tubular extension 73. The side wall 71 is integral at its lower end with a radially outwardly extending annular flange 74 having a diameter substantially the same as that of the disk 63 and having a flat, planar lower joinder surface 75. The cylindrical optics tube 76 fits telescopically slidably through the extension 73 of the cap 70 and is provided at its lower end with suitable optics 77, such as a lens or the like.

In assembly, the optics tube 76 is adjusted along the Z axis to a predetermined proper focusing depth within the cap 70 and is laser welded thereto, and the cap 70 is fitted coaxially over the header 61 with the joinder surfaces 65 and 75 in face-to-face abutting relationship, and are then laser welded together. In this assembly, it is critical that the joinder surfaces 65 and 75 be substantially coplanar, to ensure that the parts of the package 60 are precisely aligned along the optical axis thereof, thereby to optimize light coupling between the laser diode 66 and the optics 77. It is a fundamental aspect of the present invention that it permits the optimal alignment of the parts for optimum light coupling and the welding of the parts together without upsetting this alignment.

Figure 5A:
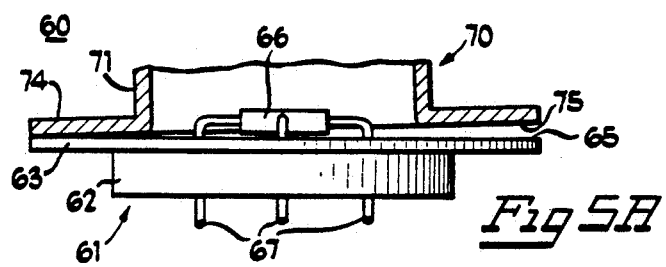
FIG. 5A is an enlarged, fragmentary view in vertical section of a package like that of FIG. 5, with the workpieces misaligned.

Referring to FIG. 5A, the joinder surfaces 65 and 75 are shown greatly enlarged. A fundamental problem in the assembly of the package 60 is that, when the cap 70 is placed on the header 61, the joinder surfaces 65 and 75 will not be perfectly coplanar, but may be slightly tilted or skewed from the coplanar condition, this tilting being shown greatly exaggerated in FIG. 5A. Such misalignment may be caused by minute imperfections in the surfaces 65 or 75, air gaps therebetween or the like, and misalignments as small as several microns can be significant. When the disk 63 and the cap flange 74 are laser welded together in the assembly operation, the surfaces 65 and 75 are pulled together by the welding operation, tending to eliminate the gaps therebetween, and this slight movement, which may be only a few microns, may be enough to misalign the parts from the optical axis and shift the parts from optimal light coupling. It may be possible to rectify this misalignment by remedial weld applications, but this is very time-consuming and expensive. Furthermore, the misalignment is often such that it cannot be remedied and the package 60 is rendered essentially worthless.

While the package 60 has been described in a particular configuration, with an optical source in the header 61 and an optical receiving element in the cap 70, it will be appreciated that the positions of the source and receiving elements could be reversed. Also, while a particular package arrangement has been shown for purposes of illustration, it will be appreciated that the system 30 and the present invention could be utilized for assembling other types of optoelectronic or other package arrangements. Also various types of welds could be provided, depending on package configuration, such as spot welds, fillet welds, butt welds and lap welds.

Referring to FIGS. 1 and 2, the system 30 includes a lower workpiece support assembly 80 for supporting the header 61 and an upper workpiece support assembly 140 for supporting the cap 70 and the optics tube 76. The lower support assembly 80 overlies the rotary drive 46 coaxially therewith and is fixedly secured thereto by suitable means for rotation therewith. The upper support assembly 140 is fixed to the attachment flange 49 of the coupling bracket 47, as will be explained more fully below.

Referring also to FIGS. 6–9, the lower support assembly 80 includes an annular housing 81 having a main body 82 provided with a plurality of fasteners 83 for securing the housing 81 to the underlying rotary drive 46. The housing 81 has a reduced-diameter, upstanding turret portion 84 having an annular, substantially planar top surface 85. Formed in the bottom of the main body 82, coaxially therewith, is a cylindrical cavity 86 which communicates with an axial bore 87 through the turret portion 84, the bore 87 having a cylindrical wall portion 88 and a downwardly and axially inwardly sloping frustoconical wall portion 89, the lower end of which is coupled to a cylindrical wall portion 91 by a radial annular shoulder 90 (see FIG. 7). The upper end of the bore 87 is provided with an enlarged-diameter counterbore 92. Formed in the lower end of the turret portion 84, parallel to the axis thereof, is an air bore 93, communicating at its upper end with the cylindrical counterbore 92 and provided at its lower end with a pneumatic fitting 94.

Figure 7A:
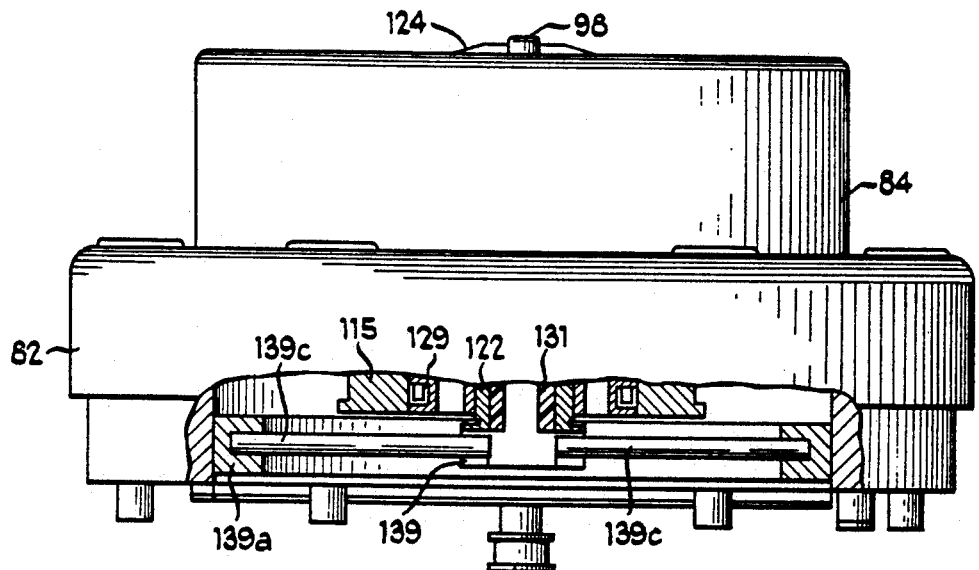
FIG. 7A is a fragmentary side elevational view of the lower workpiece support assembly of FIG. 6, as viewed from the left-hand side thereof, in partial vertical section.
Figure 7B:
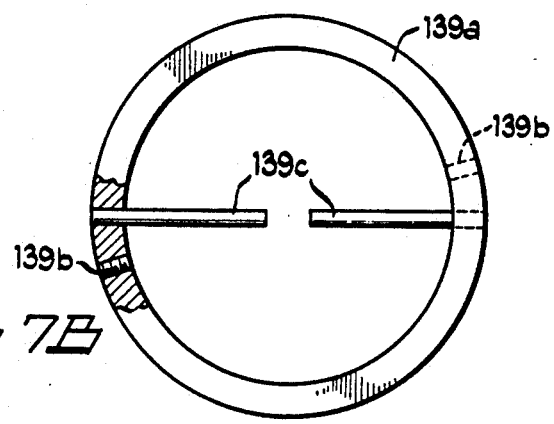
FIG. 7B is a bottom plan view of the anti-rotation ring of FIG. 7A.

The housing 91 is also provided with a nest assembly 95 (see FIGS. 6, 7 and 9). More specifically, two set screws 96 are threadedly engaged in a threaded bore 96a extending vertically through the turret portion 84 adjacent to its outer edge. A tubular fitting 97 is seated in a cylindrical counterbore 97a at the upper end of the bore 96a, the fitting 97 receiving at its upper end a alignment pin 98. The fitting 97 is internally threaded and receives therein two set screws 99, one of which bears against the bottom of the pin 98 for adjusting the distance that it extends beyond the upper end of the fitting 97. Similarly, the upper one of the set screws 96 engages the bottom of the fitting 97 for adjusting the position of its upper end, which is preferably disposed a slight distance below the top surface 85 of the turret portion 84 sufficient to accommodate the thickness of the flange 74 of the cap 70, the pin 98 and the counterbore 97a being dimensioned to provide an alignment nest for seating the cap 70.

The lower support assembly 80 is also provided with a ball and socket assembly 100, which includes a seat body 101 defining a part-spherical seat surface 102 dimensioned to matingly receive the outer surface 104 of an associated ball member 105. It is an important aspect of the invention that the seat body 101 is formed of a castable polymer material by molding in place against the surface of the ball member 105. More specifically, referring to FIG. 10, during fabrication of the ball and socket assembly 100, a mold plug 103 is disposed in the cavity 86 against the bottom wall of the turret portion 84 for closing the lower end of the bore 87 therethrough, the upper end of the plug 103 being provided centrally thereof with a part-spherical recess in which the ball member 105 is seated, so that it will be disposed substantially coaxially with the bore 87 and spaced a predetermined distance from the wall portions 88 and 89 thereof to define an annular cavity therebetween. The outer surface 104 of the ball member 105 and the upper end of the plug 103 will have been previously coated with a very thin layer of a suitable release agent. The castable polymer material, in liquid form, is then poured into the annular cavity around the ball member 105, filling it to the level of the bottom of the counterbore 92, which is approximately at the level of the center of the ball member 105.

The castable polymer may be any of a number of commercially available types which sets or cures at ambient or room temperature in about 24 hours to a hard, rigid body of high lubricity, i.e., very low coefficient of friction. The cured seat body 101 defines a seat surface 102 which mates substantially perfectly with the outer surface 104 of the ball member 105 with clearance therebetween determined by the thickness of the release agent coating. When set, the seat body 101 will bond firmly to the wall portions 88–91 of the housing 81, but will not bond to the mold plug 103 or to the ball member 105 because of the release agent thereon. When the mold plug 103 is removed, there results a ball and socket assembly of very high precision which accommodates free rotational movement of the ball member 105 about its center. The castable polymer of the seat body 101 may be of the type sold by ITW Philadelphia Resins Corporation under the trade designation "Super Alloy Orange 750".

The ball member 105 has a cylindrical bore 106 extending axially therethrough with a counterbore 106a extending most of the length thereof and provided at its upper end with a frustoconical cam surface 107 (FIG. 8). The top of the ball member 105 is truncated to define a flat, annular top surface 108 which is disposed substantially coplanar with the top surface 85 of the housing 81. The bore 106 is also provided at its lower end with a frustoconical counterbore 109, for a purpose to be explained more fully below.

Disposed in the counterbore 92 of the housing turret portion 84 is an annular ball clamp body 110 (FIG. 7), which is preferably formed of a castable polymer material and may be formed by casting it around the ball member 105 in a manner similar to that described above in connection with the ball seat body 101. More specifically, the clamp body 110 has a part-spherical clamping surface 111 which mates with the outer surface 104 of the ball member 105, the body 110 being dimensioned for close-fitted sliding movement in the counterbore 92 axially thereof. This sliding movement is limited in the downward direction by engagement with the ball member 105 and is limited in the upward direction by engagement with a retaining ring 112 seated in an annular groove 113 in the counterbore 92 adjacent to its upper end. The depth of the clamp body 110 is such that it is spaced from the bottom of the counterbore 92 to define therebetween an annular chamber 114 which communicates with the air bore 93.

In operation, the pneumatic fitting 94 is coupled to a suitable source of positive or negative pressure (not shown). When it is desired to clamp the ball member 105 in any predetermined rotational orientation, a vacuum is drawn in the chamber 114, pulling the clamp body 110 firmly into engagement with the ball member 105. To release the ball member 105, the chamber 114 is exposed to a superatmospheric pressure. It will be appreciated that the range of movement of the clamp body 110 is very small.

The ball member 105 is also provided with a cylinder 115 disposed in the cavity 86 and provided with an annular end wall 116 having an annular shoulder portion 117 centrally thereof disposed for mating engagement in the counterbore 109 of the ball member 105 and being fixedly secured thereto by suitable means. The lower portion of the cylinder 115 has relatively thick walls and is provided with a bore 118 in the lower end thereof extending parallel to the axis thereof and communicating with the interior of the cylinder 115 adjacent to its upper end, the lower end of the bore 118 being provided with a pneumatic fitting 119 for coupling to an associated source of superatmospheric air pressure (not shown).

Referring in particular to FIGS. 7 and 8, there is disposed in the bore 106 of the ball member 105 a fixture assembly 120 which includes a collet 121 having a cylindrical body 122 disposed coaxially within the cylinder 115 and integral at its upper end with four equiangularly spaced-apart arms 123 provided at their upper ends with jaws 124. Each of the jaws 124 is provided at its radially outer end with a cam follower surface 125 disposed for camming engagement with the cam surface 107 of the ball member 105. A helical compression spring 126 is seated in the counterbore 106a of the ball member 105 in surrounding relationship with the collet arms 123 and bearing against the undersides of the jaws 124 for resiliently urging the collet 121 axially upwardly, as viewed in FIGS. 7 and 8, to a normal rest or open condition. A retaining ring 127 is fixedly secured to the collet body 122 adjacent to its lower end and extends radially outwardly therefrom. An annular piston 128 is disposed immediately above the retaining ring 127 inside the cylinder 115 in the annular space between the collet body 122 and the cylinder 115 and may fixed to the former. The piston 128 is provided with a seal ring 129 to afford a fluid-tight seal to the cylinder 115. A seal ring 129a affords a fluid-tight seal between the cylinder 115 and the collet body 122. It will be appreciated that, in use, when superatmospheric pressure is applied to the annular space above the piston 128, it is driven downwardly, pulling the collet 121 axially down into the ball member 105 against the urging of the bias spring 126, so that the jaws 124 are cammed radially inwardly to a closed condition. In the present invention, the piston 128 is used to lock the collet 121 in its closed condition when it has been driven to that condition by other forces, as will be explained more fully below. Upon release of the air pressure, the collet 121 is urged by the spring 126 back to its open condition.

The fixture assembly 120 also includes a contact assembly 130 disposed coaxially within the collet 121. More specifically, the contact assembly includes a cylindrical cartridge 131 having an annular shoulder 131a (FIG. 8) which seats against the lower end of the collet 121. The cartridge 131 has a large-diameter axial bore 132 at its lower end which communicates with four equiangularly spaced-apart bores 133 parallel to the axis and disposed in a reduced-diameter upper end 134. A cylindrical electrical isolator 135 fits telescopically down over the reduced upper end 134 of the cartridge 131, the upper end of the isolator 135 being provided with four bores 136 therein, respectively aligned with the bores 133 in the cartridge 131. Respectively disposed in the bores 133 are four commercially available resilient contacts, each including a tube 137 receiving a contact element 138 which projects upwardly into the lower end of the associated bore 136, being resiliently urged upwardly by a compression spring (not shown) disposed within the tube 137. The cartridge 131 and the isolator 135 are preferably formed of electrically insulating materials, such as suitable plastics, while the tubes 137 and the contact elements 138 are electrically conductive, the tubes 137 preferably being connected to suitable electrical conductors (not shown) which extend upwardly through the bore 132 and the cartridge 131 and are coupled to associated circuitry described more fully below.

The bottom ends of the collet body 122 and the cartridge body 131 are provided with a diametrical notch 139 therethrough. An antirotation ring 139a is disposed in the lower end of the cavity 86 in the housing body 82, being secured thereto by set screws 139b. The ring carries two radially inwardly extending rods 139c, the inner ends of which are received in the notch 139 to prevent rotation of the collet 121 and the cartridge 131 about their axis (see FIGS. 7–7B).

Figure 22:
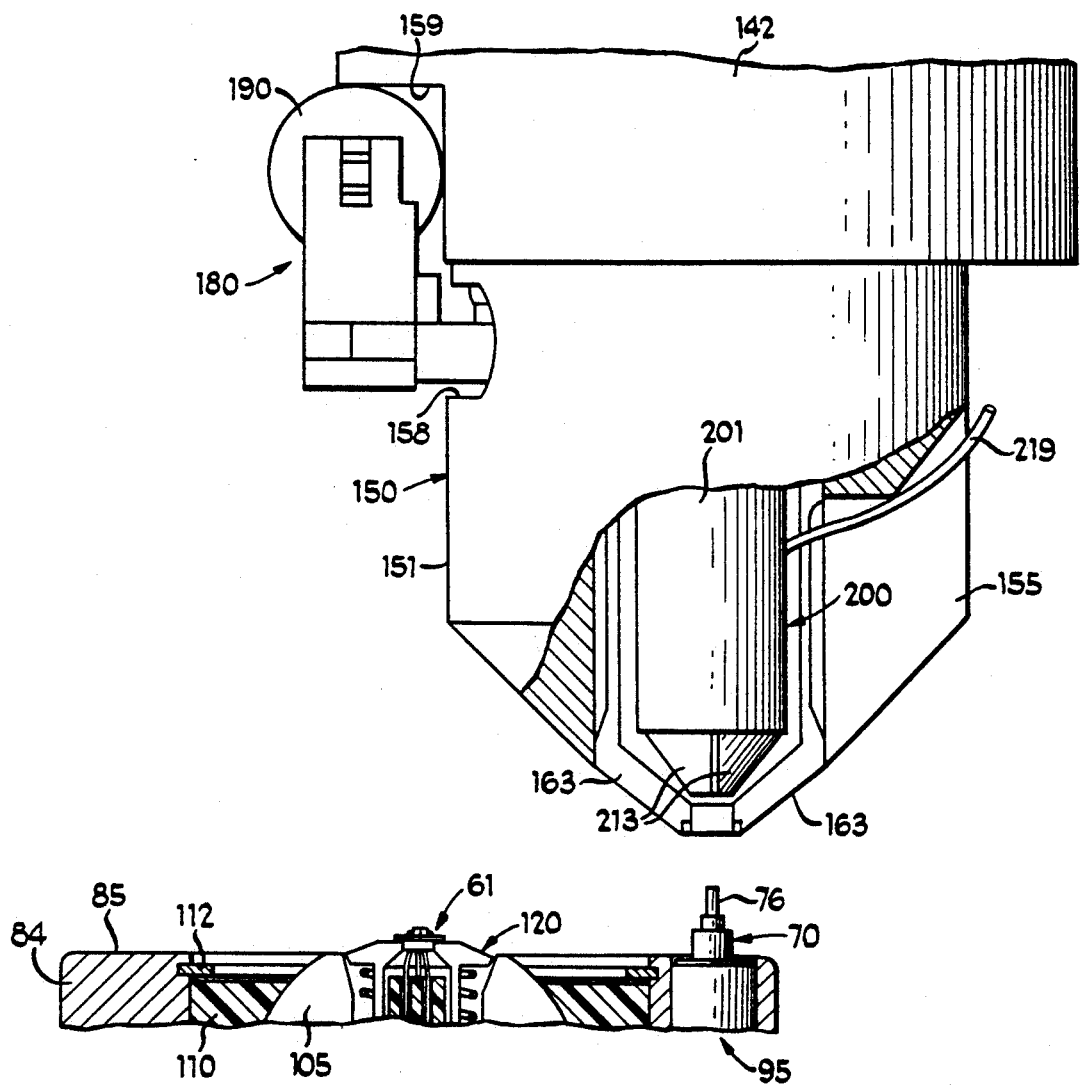
FIG. 22 is an enlarged, fragmentary side elevational view in partial section of the workpiece support assemblies of FIG. 2, as viewed from the right-side thereof, illustrated at the beginning of an assembly operation.
Figure 23:
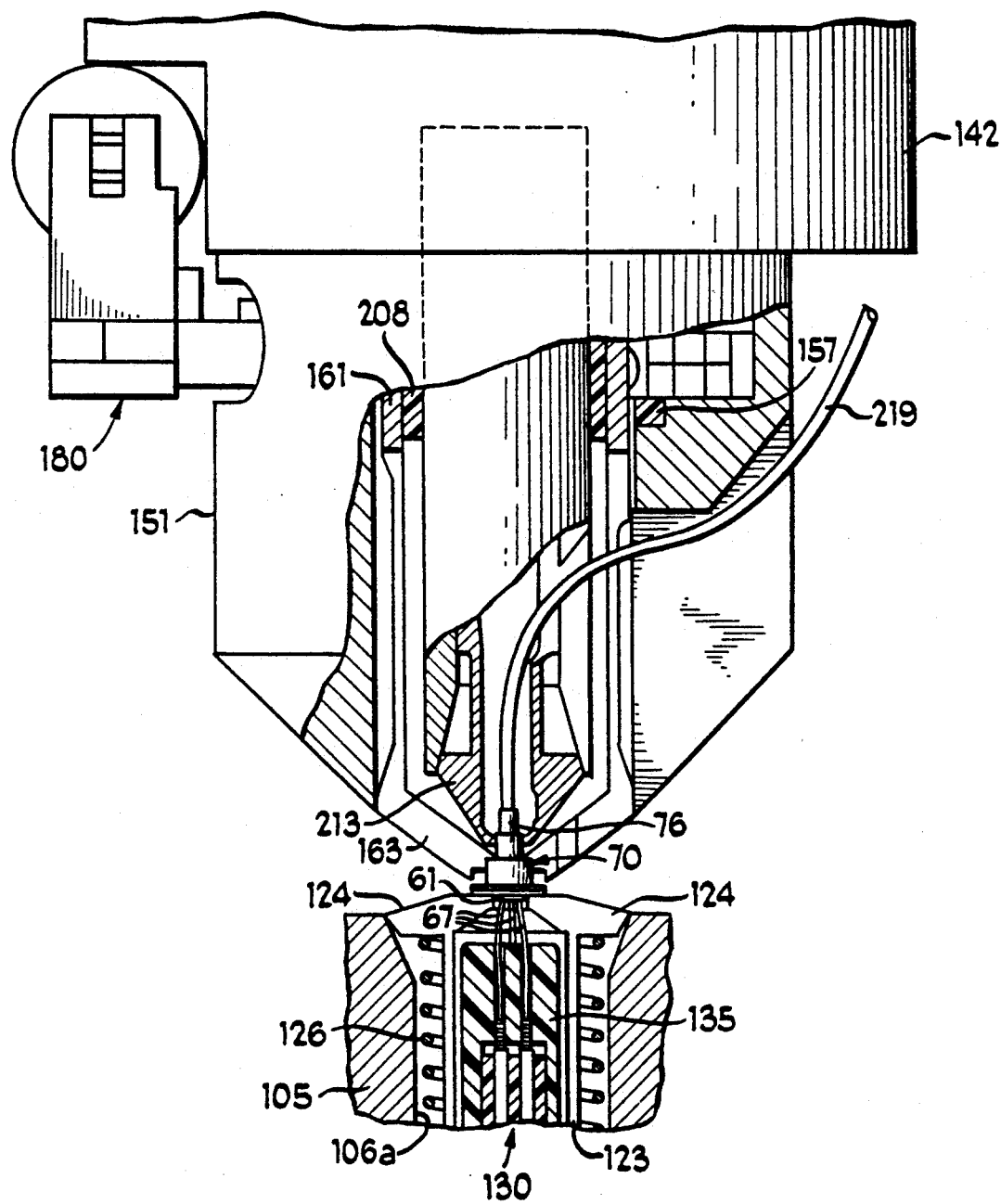
FIG. 23 is a further enlarged view similar to FIG. 22, illustrating joinder of the cap and header workpieces.

In use, when the collet 121 is disposed in its normal open condition, the cylindrical body 62 of the header 61 will fit inside the jaws 124 of the collet 121, with the disk 63 resting upon the upper surface of the jaws 124, and the header leads 67 being respectively disposed in the isolator bores 136 in engagement with the contacts 138 for electrical connection thereto (see FIGS. 22 and 23). It will be appreciated that when the collet 121 is driven to its closed condition, the jaws 124 thereof will clamp inwardly against the header body 62 securely to grip the header 61.

Referring now also to FIGS. 11–14B and 19–21, the upper workpiece support assembly 140 includes a cylindrical outer housing 141 having a main body 142 with an axial bore 143 formed in the upper end thereof and have an enlarged-diameter counterbore 144 at its upper end, the bore 143 defining a cylindrical cavity 145 (see FIGS. 12 and 13). The housing 141 has a first plurality of equiangularly spaced-apart screw holes 146 tapped in the upper end thereof around the counterbore 144 and a second plurality of screw holes 147 tapped in the bottom of the counterbore 144. Two openings 148 and 149 (FIG. 12) are respectively formed in the side wall of the main body 142 at diametrically opposed locations, communicating with the cavity 145.

The upper support assembly 140 includes an outer collet assembly 150 and an inner collet assembly 200 arranged coaxially one within the other for vertical movement relative to each other. The outer collet assembly 150 includes a collet housing 151, which is a reduced-diameter cylindrical portion of the outer housing 141, depending from the main body 142 thereof coaxially therewith. The bore 143 in the main body 142 extends a predetermined distance into the collet housing 150, terminating in an annular end wall 152. Formed in the lower end of the collet housing 151 is an axial cylindrical bore 153 which communicates with the cavity 145. The lower end of the collet housing 151 has a downwardly and axially inwardly sloping frustoconical outer end wall 154. Formed in the bottom of the collet housing 151 at equiangularly spaced-apart locations are three slots 155 (see FIGS. 2, 13 and 20) which extend radially through the collet housing 151 and extend axially upwardly at least half the length of the collet housing 151 for a purpose to be explained more fully below. An annular shoulder 156 is formed in the collet housing 151 at the upper end of the bore 153 for receiving a cast polymer ring 157 for a purpose to be explained below. A radial opening 158 is formed through the collet housing 151 adjacent to the upper end thereof, communicating with the bore 153. A notch 159 is formed in the main body 142 of the outer housing 141 immediately above the opening 158 for a purpose described below.

The outer collet assembly 150 includes an outer collet 160 which has a cylindrical base 161 disposed coaxially in the bore 153 at the upper end thereof, and integral with six equiangularly spaced apart depending arms 162, each provided at the lower end thereof with a jaw 163. The radially outer end of each jaw 163 defines a cam follower surface 164 disposed for camming engagement with the wall of the bore 153 at the lower end thereof. The inner end of each jaw 163 has a notch 165 formed therein. Rotationally, the outer collet 160 is so oriented that the slots 155 in the collet housing 15 respectively align radially with alternate ones of the gaps between adjacent jaws 163. The ring 157 has a pair of diametrically opposed keys 166 which respectively extend into keyways 167 formed in the outer surface of the outer collet base 161 to maintain this orientation (FIG. 21). The ring 157 is formed of a polymer similar to that used to form the ball seat body 101. In fabrication, the outer collet 160 is supported coaxially within the collet housing 151, and the annular space therebetween is closed at the shoulder 156 and the shoulder area is filled with a liquid castable polymer, the outer surface of the outer collet base 161 and the keyways 167 having first been coated with a suitable release agent. When the polymer cures it bonds to the housing 151 but is freely slidable with respect to the collet 160, the clearance therebetween being determined by the thickness of the release agent coating.

The outer collet assembly 150 includes a collet ejection assembly 170 (FIGS. 12 and 13) which includes an upper ejection ring 171 which encircles the outer collet 160 and has a cylindrical flange 172 depending from its outer edge which is, in turn, integral at its lower end with a radially outwardly extending annular flange 173 which has an outer diameter very slightly less than that of the cavity 145 for axial movement with respect thereto. The flange 173 is disposed beneath a retaining ring 174 which is seated in a groove 175 in the wall of the cavity 145 for limiting upward movement of the ejection ring 171. Formed in the underside of the ejection ring 171 are four equiangularly spaced-apart cylindrical pockets 176 (two shown in FIG. 12). Two bores 176a are formed vertically through the ejection ring 171 at diametrically opposed locations between pockets 176. The ejection assembly 170 also includes a lower ejection ring 177 which fits inside the cylindrical flange 172 of the upper ejection ring 171 in surrounding relationship with the outer collet 160 and overlies a retaining ring 178, which is seated in a circumferential groove in the outer surface of the outer collet 160. Formed in the upper surface of the lower ejection ring 177 are four equiangularly spaced-apart cylindrical pockets 179 vertically aligned, respectively, with the pockets 176 in the upper ejection ring 171, for respectively receiving four helical compression springs 179a which resiliently urge the ejection rings 171 and 177 vertically apart. Also formed through the lower ejection ring 177, respectively in vertical alignment with the bores 176a in the upper ejection ring 171, are two tapped bores 179b, in which are respectively disposed set screws 179c which project downwardly from the lower ejection ring 177, access thereto being provided through the bores 176a. In use, it will be appreciated that the springs 179a urge the outer collet 160 vertically downwardly, relative to the collet housing 151, to a normal open condition of the outer collet 160.

The outer collet assembly 150 also includes a collet clamp assembly 180 (FIGS. 2, 13 and 15-17) which includes a pair of substantially semi-cylindrical clamp jaws 181 which are disposed at the bottom of the cavity 145 and surround the upper end of the outer collet 160. The clamp jaws 181 are pivotally interconnected at a pivot pin 182 (FIGS. 13 and 15). Fixedly secured to the inner surfaces of the clamp jaws 18 are a plurality of spaced-apart clamp pads 183 for engagement with the outer surface of the outer collet 160. The free ends of the clamp jaws 181 are respectively integral with radially outwardly extending arms 184, which project outwardly through the opening 158 in the collet housing 151. The arms 184 are respectively provided with rod ends 185, which are respectively pivotally connected to lugs 186 of clevis arms 187 which are, in turn, pivotally interconnected at 188. The upper end of one of the clevis arms 187 is engaged with the outer end of a piston rod 189 of an air cylinder 190, which is accommodated in the notch 159 in the main body 142 of the upper support assembly 140. The other end of the air cylinder 190 is pivoted at 191 to the upper end of the other clevis arm 187. Overlying the clamp jaws 181 is a pre-load ring 192 which is resiliently urged against the clamp jaws 181 by an O-ring 193 disposed between the pre-load ring 192 and the flange 173 of the upper ejection ring 171 (see FIG. 13).

In use, the O-ring 193 and the pre-load ring 192 serve resiliently to urge the clamp jaws 181 into firm seating engagement with the end wall 152 of the cavity 145. The collet clamp assembly 180 essentially floats on the outer housing 141 of the upper support assembly 140. When it is desired to clamp the outer collet 160, the air cylinder 190 is actuated, extending the piston rod 189 to spread the clevis arms 187, thereby pivoting their lugs 186 together about the pivot 188. This moves the clamp jaws 181 together about their pivot 182, bringing the clamp pads 183 into firm clamping engagement with the outer surface of the outer collet 160, thereby locking it against vertical movement relative to the collet housing 151.

Referring to FIGS. 12 and 13, a mounting block 194 is mounted in the opening 148 in the outer housing 141 for supporting a microswitch 195, which has a depending actuator arm 196 disposed for engagement with the upper end of the outer collet 160 to serve as a limit stop to upward movement of the outer collet 160 relative to the collet housing 151 to prevent damage to the assembly. Upper and lower proximity sensors 197 and 198 are respectively supported on mounting blocks 199 mounted in the opening 149 in the main body 142 of the upper support assembly 140, for a purpose to be explained more fully below.

The inner collet assembly 200 (FIGS. 12-14 and 21) includes a cylindrical collet housing 201 disposed coaxially within the outer collet 160 and having an axial bore 202 therethrough with first and second upper counterbores 203 and 204 and a lower counterbore 205, provided at its lower end with a downwardly and outwardly tapering frustoconical cam surface 206 (FIG. 14). A downwardly and inwardly sloping slot 207 is formed through the collet housing 201 adjacent to its lower end. The collet housing 201 is rotationally positioned so that the slot 207 will face rearwardly of the upper support assembly 140 away from the air cylinder 190, and will be aligned with one of the slots 155 in the outer collet housing 151 (see FIG. 13). In order to maintain this orientation, the outer surface of the inner collet housing 201 is provided at diametrically opposed locations with vertically extending grooves or keyways 209a (FIG. 21) in which are disposed keys 209 of a cast polymer spacer sleeve 208, which is secured to the inner surface of the outer collet 160. More specifically, the spacer sleeve 208 is formed of a castable polymer similar to that used to form the ball seat body 101, described above in connection with FIG. 10, this material being curable to a rigid body with a very low Coefficient of friction. In fabricating the spacer sleeve 208, the inner collet housing 201 is supported coaxially within the outer collet 160, and the annular space therebetween is closed at the lower end of the base 161 of the outer collet 160 and is the filled with a liquid castable polymer, the outer surface of the inner collet housing 201 and the keyways 209a therein having first been coated with a suitable release agent. Thus, when the spacer sleeve 208 has set, it bonds firmly to the outer collet 160, while the inner collet housing 201 is freely slidable vertically with respect thereto, with the clearance therebetween being determined by the thickness of the release agent coating.

Figure 14A:
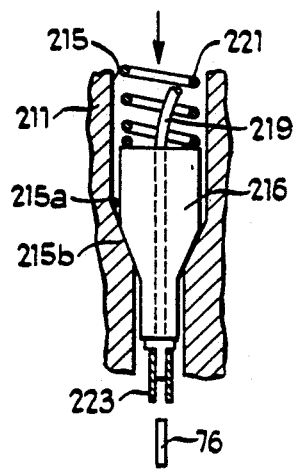
FIG. 14A is a still further enlarged, fragmentary view in partial section of the ferrule sleeve of the inner collet assembly of FIG. 14, in its normal rest condition.

Disposed coaxially in the lower counterbore 205 of the inner collet housing 201 is an inner collet 210 having a cylindrical base 211 with three equiangularly spaced-apart depending arms 212, each provided at its lower end with a radially inwardly projecting jaw 213. Each of the jaws 213 is provided at its radially outer end with a cam follower surface 214 disposed for camming engagement with the frustoconical cam surface 206 of the inner collet housing 201. The inner collet 210 has an axial bore 215 therethrough with a frustoconical portion 215a (FIG. 14A). In the lower end of bore 215 is seated an elongated ferrule sleeve 216 having a frustoconical portion 215b which mates with the portion 215a. The ferrule sleeve 216 has a slot 216a (FIG. 14) extending the length thereof, the ferrule sleeve 216 being rotationally oriented so that the slot 216a is aligned with the slot 207 in the inner collet housing 201. In order to maintain this rotational orientation, the ferrule sleeve 216 is provided with another slot 216b therein which receives an anti-rotation set screw 217 threadedly in a radial bore 218 in the inner collet base 211. The ferrule sleeve 216 receives therein an elongated fiber optic ferrule 219 having a radially outwardly extending annular shoulder 219a which bears against the lower end of the ferrule sleeve 216, the upper end of the ferrule 219 extending radially outwardly through the slots 216a and 207 in the ferrule sleeve 216 and the inner collet housing 201, respectively, and then through the aligned one of the slots 155 in the outer collet housing 151.

Threadedly engaged in the upper end of the bore 215 and projecting upwardly above the upper end of the inner collet 210 is a stroke adjuster 220. A helical compression spring 221 is disposed in the bore 215 between the stroke adjuster 220 and the ferrule sleeve 216 for resiliently urging the latter downwardly to a position illustrated in FIG. 14A, wherein the frustoconical portion 215b thereof is seated on the frustoconical portion 215a. This affords a self-centering of the ferrule sleeve 216. The stroke adjuster 220 is stopped against the upper end of the counterbore 205. Disposed in surrounding relationship with the stroke adjuster 220 above the inner collet 210 is a helical compression spring 222 which resiliently urges the inner collet 210 axially downwardly relative to the collet housing 201 to a normal open condition. A split ceramic alignment sleeve 223 encircles the lower end of the ferrule 219 in resilient gripping engagement therewith and abuts the shoulder 219a thereon, the sleeve 223 projecting a predetermined distance downwardly below the lower end of the ferrule 219, but terminating short of the collet jaws 213.

The stroke adjuster 220 is fixedly secured to the lower end of a piston rod 224 which extends upwardly and has its upper end secured to a piston 225 disposed in the upper counterbore 204 and provided at its outer surface with an annular seal ring 226 affording a fluid-tight seal against the inner wall of the inner collet housing 201. The piston rod 224 extends through an annular seal cap 227 which is seated at the bottom of the counterbore 204 and retains in the counterbore 203 a fluid-tight seal 228 surrounding the piston rod 224. The piston 225 is provided with a pneumatic fitting or nipple 229 which is adapted for connection by a suitable conduit (not shown) to an associated source of superatmospheric air, the fitting 229 communicating through a channel (see FIG. 12) in the piston 225 to the space therebelow. It will be appreciated that when this space is pressurized, the piston 225 will be driven upwardly, pulling the inner collet 210 vertically upwardly relative to the inner collet housing 201, thereby to cam the jaws 213 radially inwardly to a closed condition against the urging of the spring 222.

Figure 18:
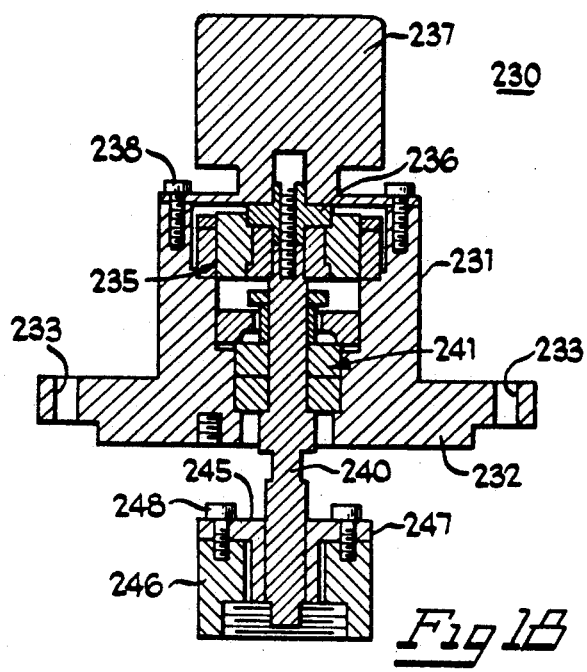
FIG. 18 is a view in vertical section of the drive assembly of the upper workpiece support assembly of FIG. 2.
Figure 19:
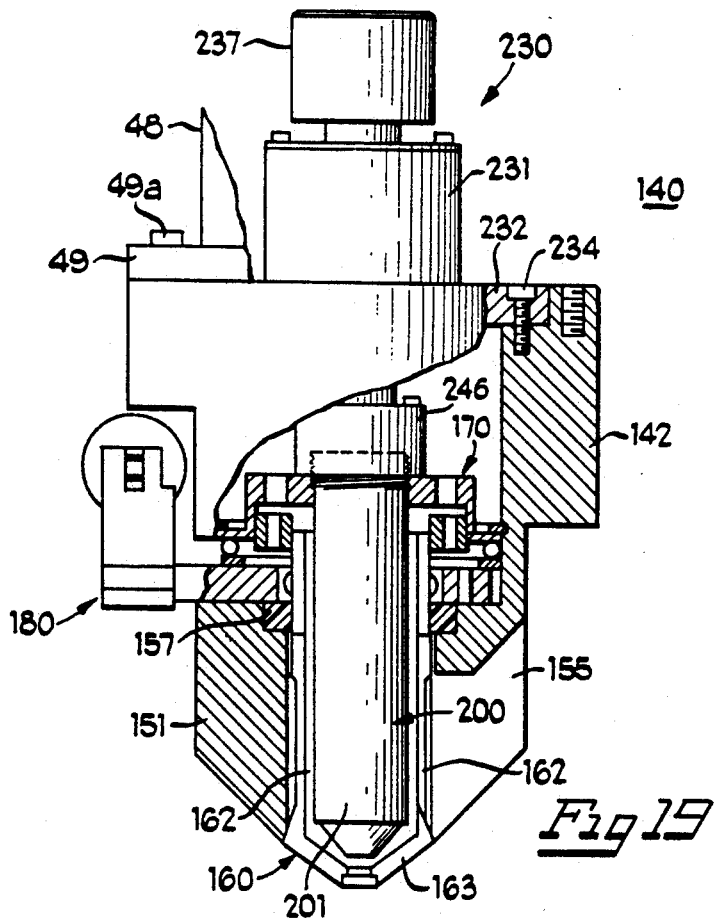
FIG. 19 is a slightly enlarged side elevational view of the upper workpiece support assembly of FIG. 11, as viewed from the lower side thereof, with portions illustrated in vertical section.

Referring in particular to FIGS. 18 and 19, the upper support assembly 140 includes a collet drive assembly 230 for effecting vertical movement of the inner collet assembly 200 relative to the outer collet assembly 150. The collet drive assembly 230 includes a cylindrical housing 231 having a radially outwardly extending annular flange 232 at its lower end, dimensioned to be seated in the counterbore 144 of the outer housing 141 of the upper support assembly 140 and provided with a plurality of holes 233 therethrough for respectively receiving screws 234 threadedly engageable in the screw holes 147 fixedly to secure the housing 231 to the outer housing 141. Seated in the upper end of the housing 231 is a DC motor 235 having an output shaft 236 extending axially of the housing 231 and connected at its upper end to a rotary encoder 237 which is secured by mounting screws 238 to the upper end of the housing 231. The motor shaft 236 is also connected to one end of a ball screw 240 which extends downwardly axially through the housing 231, passing through a duplex bearing assembly 241 mounted in the housing 231, and threadedly engaged at its lower end with a ball nut 245. The nut 245 extends downwardly into a cylindrical collet cap 246 and is provided at its upper end with a radially outwardly extending attachment flange 247 which overlies the collet cap 246 and is fixedly secured thereto by screws 248. The lower end of the collet cap 246 is internally threaded for threaded engagement with the upper end of the inner collet housing 201.

It will be appreciated that, as the DC motor 235 is rotated, the nut 245 and the inner collet assembly 200 secured thereto will move vertically upwardly and downwardly, depending upon the direction of rotation of the motor 235, relative to the outer collet assembly 150 on which the collet drive assembly 230 is mounted.

Figure 24:
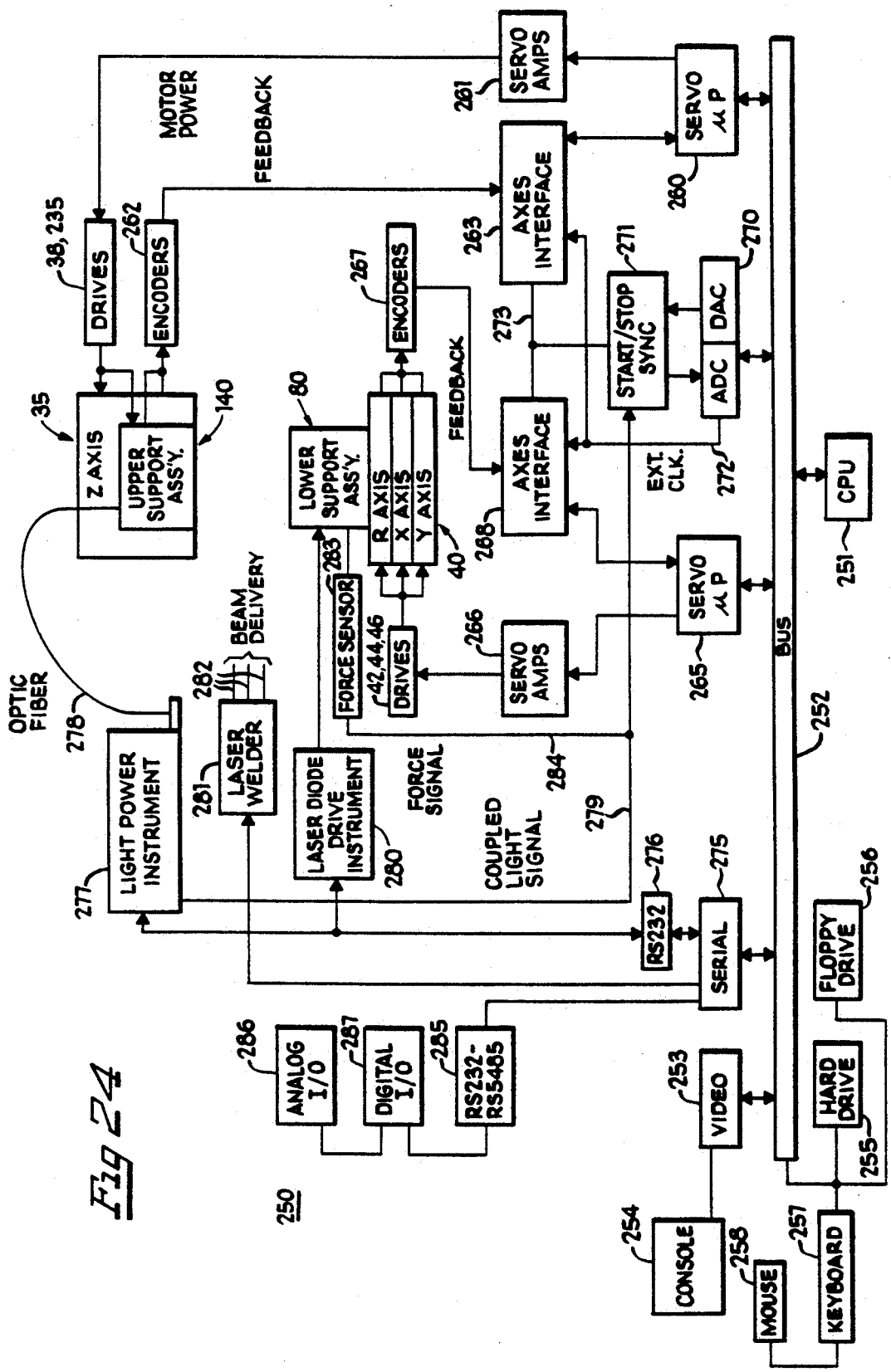
FIG. 24 is a functional block diagram of the control circuit for the system of FIG. 1.
Figure 25:
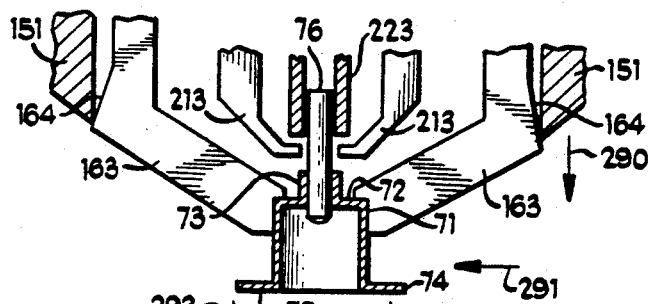
FIGS. 25–29 are fragmentary, partially diagrammatic views illustrating steps in a typical assembly operation using the system of FIG. 1 to assemble the workpieces of FIGS. 3–5.

Referring now to FIG. 24, there is illustrated a control system, generally designated by the numeral 250, for control of the system 30 illustrated in FIG. 1. The control system 250 includes a central processing unit ("CPU") 251, operating under stored program control, and communicating through a bus 252 with a number of other components. More specifically, the bus 252 is coupled to video circuits 253 for controlling the operation of a CRT display console 254. The bus 252 is also connected to storage media, including a hard disk drive 255 and a floppy disk drive 256, the bus 252 also being coupled to a keyboard 257 and a mouse 258 for operator input.

The bus 252 is also coupled to servo microprocessors 260 and 265, each operating under stored program control and respectively controlling the operations of the upper and lower support assemblies 140 and 80 and the axis drives coupled thereto. More specifically, the servo microprocessor 260 is coupled through servo amplifiers 261 to the Z-axis drive mechanism 38 and the collet drive motor 235. The rotary encoder 237 and a linear encoder 38b for the Z-axis drive mechanism 38 (jointly indicated at 262), provide feedback signals through axes interfaces circuitry 263 to the servo microprocessor 260. In like manner the servo microprocessor 265 is coupled through servo amplifiers 266 to the Y-axis, X-axis and rotary drives 42, 44 and 46 for controlling the operation thereof. The linear encoders 42b and 44b in the X-and Y-axis drives and a rotary encoder in the rotary axis drive (jointly indicated at 267) provide feedback signals through axes interfaces circuitry 268 to the servo microprocessor 265.

The bus 252 is also coupled through analog/digital and digital/analog conversion circuitry 270 to start/stop sync circuitry 271. The analog/digital conversion circuitry provides external clock signals to the axes interfaces circuitry 263 and 268, which circuitry also receives control signals from the start/stop sync circuitry 271 via output lines 273.

The bus 252 is also coupled to serial ports 275, one of which is connected through an RS232 communication interface 276 to a light power instrument 277, which receives a light signal from the upper support assembly 140 via an optic fiber 278. This optical signal is the signal received through the optics 77 of the package 60 being assembled and fed through the ferrule 219. In response to this optical signal, the light power instrument 277 outputs to the start/stop sync circuitry 271 via line 279 an electrical signal indicative of the magnitude of the coupled light.

The RS232 interface 276 is also coupled to a laser diode drive instrument 280, which powers the laser diode 66 of the package 60 through its leads 67, which are seated in the lower workpiece support assembly 80. Another of the serial ports 275 is coupled to a laser welder 281 which generates three Nd:YAG laser beams, respectively delivered by fiber optic cables 282 to the laser tubes 59 of the laser welding assemblies 50. The lower support assembly 80 is coupled to a force sensor 283 which senses the force with which the upper support assembly 140 is pressed against it, as will be described below, and generates an electrical force signal which is delivered via the lines 284 and 279 to the start/stop sync circuitry 271.

Another of the serial ports 275 may also be coupled through an RS232-485 interface to analog I/O circuitry 286 and digital I/O circuitry 287 for other inputs and outputs. In particular, the digital I/O circuitry 287 controls the operation of the pneumatic components of the lower and upper support assemblies 80 and 140.

Referring now to FIGS. 22-29, the operation of the system 30 during the assembly of a package or module 60 will be described in detail. Initially, the system 30 is disposed in a normal rest condition, i.e., with each of the collets 121, 160 and 210 disposed in its normal open condition. The operator first places the header workpiece 61 in the fixture assembly 120 with the leads 67 properly oriented, and places the cap workpiece 70, with the optics tube 76 disposed therein, in the nest assembly 95 (see FIG. 22). The control system 250 will have been previously programmed to accurately "know" the position of the nest assembly 95. When the header workpiece 61 is inserted in the fixture assembly 120, its leads 67 will be in electrical engagement with the contacts 138, which are in turn coupled to the laser diode drive instrument 280 (FIG. 24) for powering the laser diode 66, which generates a laser beam which is directed substantially vertically upwardly from the header workpiece 61. As can be seen from FIGS. 27-29, when a header 61 is seated in the fixture assembly 120, its cylindrical body 62 is disposed inside the collet jaws 124, while its disk 63 is seated on top of the collet jaws 124.

Figure 14B:
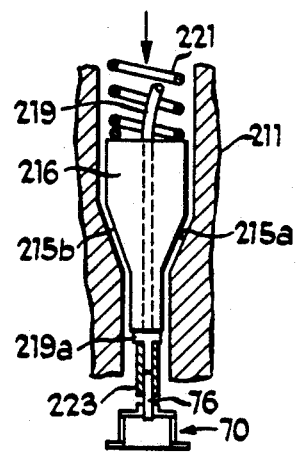
FIG. 14B is a view similar to FIG. 14A when the workpiece engages the ferrule.

Upon the actuation of a start control, the program of the control system 250 will automatically operate the microrobotic alignment and welding system 30 to bring the upper workpiece support assembly 140 into vertical alignment with the cap workpiece 70. More specifically, the X-Y axes assembly 40 will move the lower workpiece support assembly 80 until the cap workpiece 70, resting in the nest assembly 95, is accurately brought into alignment beneath the upper support assembly 140, as illustrated in FIG. 22. The upper support assembly 140 will then be lowered down over the cap 70 by the action of the Z-axis drive mechanism 38, so that the cylindrical side wall 71 thereof is received between the outer collet jaws 163, and the optics tube 76 is received between the inner collet jaws 213 and into the lower end of the alignment sleeve 223 until in engages the lower end of the ferrule 219. In this regard, it will be appreciated that the ferrule 219 is biased into engagement with the optics tube 76 by the spring 221 (FIG. 14), and as the upper support assembly 140 is lowered the ferrule sleeve 216 is unseated from the frustoconical portion 215a, as indicated in FIG. 14B, so as to act like an FC connector of the type with which the package 60 may be mated in the field.

The downward movement of the upper support assembly 140 continues until the notches 165 in the outer collet jaws 163 bottom on the cap end wall 72. At this point, the downward movement of the outer collet 160 is stopped, but the collet housing 151 continues moving downwardly, as indicated by the arrow 290 in FIG. 25, this relative movement being accommodated by the spring-loaded collet ejection assembly 170. As the collet housing 151 moves down, it cams the outer collet jaws 163 radially inwardly into gripping engagement with the cylindrical side walls 71 of the cap 70, as indicated by the arrow 291 in FIG. 25. Continued downward movement of the outer collet housing 151 tends to drive the outer collet 160 against the cap 70 with a force, indicated by the arrows 292 in FIG. 25, which is sensed by the force sensor 283 (FIG. 24) and fed back to the start/stop sync circuitry 271, which operates through the axes interfaces circuitry 263, the servo microprocessor 260 and the servo amplifiers 261 to turn off the Z-axis drive mechanism 38. The collet clamp assembly 180 will then be actuated through the digital I/O circuitry 287 for locking the outer collet 160 in its closed condition.

Figure 26:
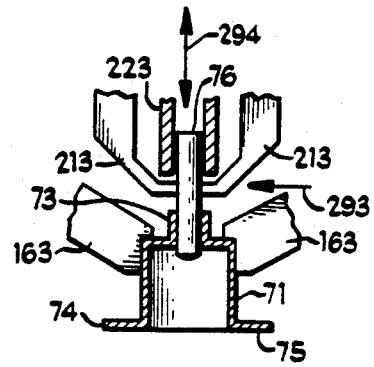
Figure 27:
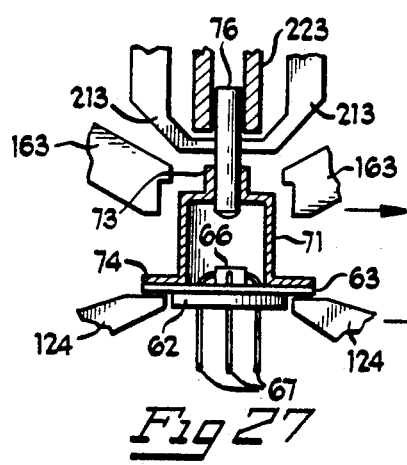

Referring to FIGS. 14 and 26, the inner collet piston 225 will then similarly be actuated to withdraw the inner collet 210 into the collet housing 201, camming the collet jaws 213 inwardly to their closed condition in firm gripping engagement with the optics tube 76 between the tubular extension 73 of the cap 70 and the lower end of the alignment sleeve 223, as indicated by the arrow 293 in FIG. 26. The Z-axis drive mechanism 38 is then actuated to lift the entire upper support assembly 140 clear of the nest assembly 95 so that the X-Y axes assembly 40 can then be operated to move the lower support assembly 80 into vertical alignment with the upper support assembly 140. It will be appreciated that, when the upper support assembly 140 is raised, the outer collet 160 cannot return to its open condition under the urging of the collet ejection assembly 170, because of the locking action of the collet clamp assembly 180. Similarly, the inner collet 210 cannot be driven back to its open condition by the spring 222 because of the air pressure on the piston 225.

While the lower and upper support assemblies 80 and 140 are being moved into vertical alignment with each other, the inner collet drive assembly 230 is actuated to vertically move the optics tube 76 to a predetermined vertical location relative to the cap 70, as indicated by the arrow 294 in FIG. 26. In this regard, it will be appreciated that the tubular extension 73 of the ca 70 lightly grips the optics tube 76 so that it cannot fall therefrom by gravity, but can be readily moved vertically with respect thereto by the collet drive assembly 230. When the upper and lower support assemblies 140 and 80 have been brought into vertical alignment, the upper support assembly 140 is lowered by action of the Z-axis drive mechanism 38 to deposit the cap 70 on the header 61, whereupon the collets 121 and 160 will be released, as is indicated by the arrows in FIG. 27. More specifically, the air cylinder 190 is deenergized for releasing the collet clamp assembly 180, so that the outer collet 160 can return to its open condition under the action of the collet ejection assembly 170. The control system 250 makes sure that there is no super- atmospheric air being admitted to the cylinder 115, so that the collet 121 will be urged upwardly to its normally open condition by the bias spring 126. A slight positive pressure is applied to the chamber 114 to make sure that the ball clamp body 110 is out of contact with the ball member 105 so that it is freely rotatable.

Figure 28:
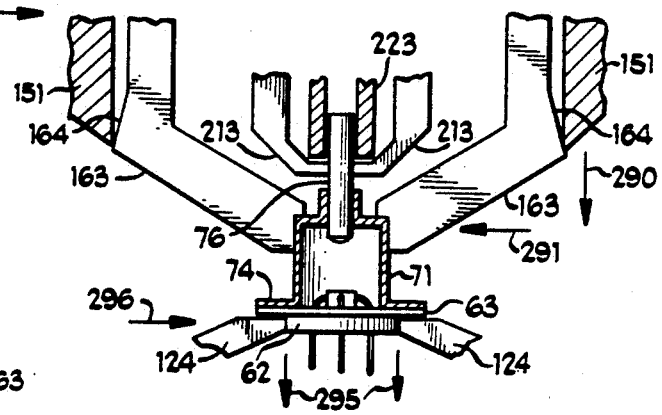

The system 30 then goes through a press routine, wherein the upper support assembly 140 is again lowered, by action of the Z-axis drive mechanism 38, as is illustrated in FIG. 28. The outer collet jaws 163 again bottom on the cap end wall 72, continued downward movement of the outer collet housing 151, as indicated by the arrow 290, camming the collet jaws 163 inwardly into gripping engagement with the cap side wall 71, as indicated by the arrow 91. The continued downward movement of the upper support assembly 140 also presses the fixture assembly 120, on which the header 61 is seated, down into the bore 106 in the ball member 105, against the urging of the bias spring 126, as indicated by the arrows 295 in FIG. 28. This movement cams the collet jaws 124 radially inwardly to their closed condition in firm clamping engagement with the cylindrical body 62 of the header 61, as is indicated by the arrow 296 in FIG. 28. The downward pressing movement will continue until a predetermined force is exerted on the header 61, as detected by the force sensor 283 (FIG. 24), sufficient to ensure that the joinder surfaces 65 and 75 are completely parallel with each other and disposed in a substantially coplanar configuration, with no gaps therebetween.

It is a fundamental aspect of the invention that if, before this pressing operation, the joinder surfaces 65 and 75 are out of parallelism, as indicated in FIG. 5A, the free rotational movement of the ball member 105 will accommodate movement of the header 61 sufficiently to bring the joinder surfaces 65 and 75 into parallelism in response to the vertically downward pressing action of the upper support assembly 140. In other words, the header 61 will automatically align itself vertically with the cap 70 along a common vertical axis. The Z-axis drive mechanism 38 will then be stopped, the outer collet 160 will be clamped closed by the collet clamp assembly 180, the lower collet 121 will be locked closed by applying positive pressure to the piston 128, and the ball member 105 will be clamped by drawing a vacuum in the chamber 114.

Figure 29:
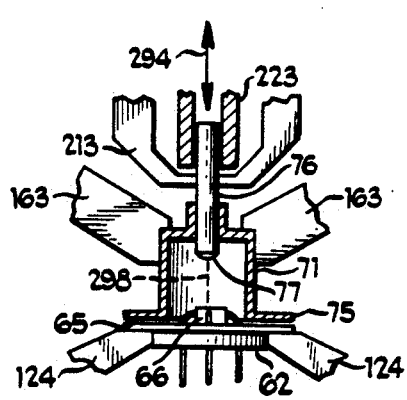

The upper support assembly 140 will then be backed off by the Z-axis drive mechanism 38 a slight distance, approximately 20-50 microns, to assure clearance between the joinder surfaces 65 and 75, as illustrated in FIG. 29, to allow the optical alignment process to take place. The rotary encoder 237 measures this distance and it is stored.

More particularly, the X-Y axes assembly 40 will first be operated to do a coarse scan in the X-Y plane to bring the beam 298 from the laser diode 66 into coarse alignment with the optics 77, i.e., so that the optics 77 acquires some light from the laser diode 66. This scan will progress in accordance with a pre-programmed routine until light acquisition is detected by the light power instrument 277, which feeds its coupled light signal back to the start/stop sync circuitry 271 to stop the scan. The inner collet drive assembly 230 is then actuated to perform a coarse scan in the Z direction, as direction by the arrow 294 in FIG. 29, until the optics 77 are focused to a coarse maximum. Then optimization scans are repeated in the X-Y plane and in the Z direction to achieve maximum light coupling. The optics tube 76 is then vertically raised the precise clearance distance between the joinder surfaces 65 and 75, which distance was read by the rotary encoder 237 when the upper support assembly 140 was backed off from the header 61 after the completion of the press routine. This is to compensate for the closure of that clearance distance when the joinder surfaces 65 and 75 are moved back together.

The optics tube 76 is then welded to the tubular extension 73 of the cap 70 by the laser welding assemblies 50. Since this welding operation may slightly alter the optical alignment, the system 30 again re-optimizes the light coupling in the X-Y plane. Then the Z-axis drive mechanism 38 is actuated to bring the joinder surfaces 65 and 75 back into contacting coplanar relationship, whereupon the cap flange 74 is welded to the header disk 63 by the welding assemblies 50. In this regard, the slots 155 in the outer collet housing 151 provide beam clearance for the welding lasers. This permits the lasers to be mounted above the upper support assembly 140 without interference by the collet housing 151.

The assembly of the package 60 is then complete and the collets 121, 160 and 210 may all be released and the upper support assembly 140 raised to permit removal of the finished package 60 from the fixture assembly 120. It will be appreciated that the laser welding assemblies 50 may be utilized to provide spot welds or, by use of the rotary drive 46, can form various types of continuous welds, such as butt welds, lap welds and fillet welds. Also the system 30 could be used for precision assembly applications other than laser welding, e.g., glue bonds.

From the foregoing, it can be seen that there has been provided a microrobotic alignment and welding system with improved work piece support assemblies which permit handling and alignment of three separate workpieces which permits abutting plane surfaces to be brought into virtually coplanar relationship, which permits parts to be precisely aligned along a common optical axis, and which essentially permits self-alignment of a workpiece in response to the application of force thereto.

We claim:

1. Apparatus for aligning a workpiece along an axis with respect to which it may be slightly misaligned comprising: a ball member, fixture means carried by said ball member for holding the workpiece aligned along a radius of said ball member, socket means seating said ball member with its center on said axis for free universal rotational movement about said center, and aligning means movable along said axis for engagement with the workpiece to move it into alignment with said axis, said ball member cooperating with said socket means for accommodating said aligning movement of the workpiece in response to engagement by said aligning means.

2. The apparatus of claim 1, wherein said socket means includes a cast polymer seat.

3. The apparatus of claim 1, wherein said fixture means includes a collet disposed in a radial bore in said ball member coaxially therewith and movable axially thereof, said collet being disposed in camming engagement with said ball member and responsive to axial movement relative thereto for shifting between open and closed conditions with respect to the workpiece.

4. The apparatus of claim 3, wherein said collet is responsive to engagement of the workpiece by said aligning means with a predetermined force for moving axially into said bore and shifting to the closed condition for firmly gripping the workpiece.

5. The apparatus of claim 3, and further comprising collet locking means for holding said collet in its closed condition after disengagement of said alignment means from the workpiece.

6. The apparatus of claim 5, wherein said collet locking means includes pneumatic piston means coupled to said collet.

7. The apparatus of claim 1, and further comprising ball locking means engageable with said ball member for preventing movement thereof relative to said socket means.

8. The apparatus of claim 7, wherein said ball locking means includes a locking seat member formed of a cast polymer and conforming to the shape of said ball member.

9. The apparatus of claim 8, wherein said ball locking means includes pneumatic means for urging said seat member into engagement with said ball member.

10. The apparatus of claim wherein the workpiece includes a plurality of elongated electrical leads, said fixture means including receptacle means for receiving said leads to orient the workpiece in said fixture means, said receptacle means including means maintaining said leads in electrical contact with an associated power source.

11. Apparatus for grasping coaxially telescoping inner and outer objects and moving them axially relative to each other, comprising: an outer collet assembly including an outer housing and an outer collet coaxially received within said outer housing and dimensioned for receiving and grasping the outer object, first drive means for effecting relative axial movement of said outer collet and said outer housing for moving said outer collet between open and closed conditions relative to the outer object, an inner collet assembly disposed coaxially within said outer collet and including an inner housing and an inner collet coaxially received within said inner housing and dimensioned for receiving and grasping the inner object, second drive means for effecting relative axial movement of said inner collet and said inner housing for moving said inner collet between open and closed conditions relative to the inner object, and third drive means for effecting axial movement of said inner collet assembly relative to said outer collet assembly.

12. The apparatus of claim 11, wherein said first drive means is coupled to said outer housing for effecting movement thereof, and further comprising means supporting said outer collet on said outer housing for axial movement relative thereto.

13. The apparatus of claim 11, wherein said second drive means is coupled to said inner collet for effecting movement thereof.

14. The apparatus of claim 13, wherein said second drive means includes pneumatic piston means coupled to said inner collet.

15. The apparatus of claim 11, wherein said third drive means is coupled to said inner housing for effecting movement thereof relative to said outer collet assembly, said inner collet being carried by said inner housing.

16. The apparatus of claim 15, wherein said third drive means includes electric motor means carried by said outer housing, and ball screw means coupled between said motor means and said inner housing.

17. The apparatus of claim 14, and further comprising clamping means engageable with said outer collet for preventing movement relative to said outer housing.

18. The apparatus of claim 17, wherein said clamping means is carried by said outer housing.

19. The apparatus of claim 18, wherein said clamping means includes pneumatically operated means.

20. The apparatus of claim 18, and further comprising bias means coupled between said outer housing and said outer collet for resiliently urging said outer collet to its open condition.

21. Apparatus for bringing together first and second planar surfaces, respectively on first and second workpieces, so that said surfaces are substantially coplanar, comprising: first fixture means for holding the first workpiece in a predetermined orientation with said first planar surface substantially perpendicular to a predetermined axis, first drive means for moving said first fixture means and the first workpiece along said axis, a ball member, second fixture means carried by said ball member for holding the second workpiece aligned along a radius of said ball member with said second planar surface disposed approximately perpendicular to said axis, and socket means seating said ball member for free universal rotational movement about its center, said first drive means being operative for moving said first planar surface into contact with said second planar surface with a predetermined force sufficient to move said second planar surface into a condition perpendicular to said axis and substantially coplanar with said first planar surface, said ball member cooperating with said socket means for accommodating said movement of the second planar surface in response to engagement by the first planar surface.

22. The apparatus of claim 21, wherein said first fixture means includes a collet assembly having a housing and a first collet coaxially received within said housing and dimensioned for receiving and grasping the first workpiece.

23. The apparatus of claim 22, and further comprising first locking means engageable with said first collet for preventing movement thereof relative to said housing.

24. The apparatus of claim 22, wherein said ball member has a radial bore therein, said second fixture means including a second collet disposed in said bore and movable axially thereof and dimensioned for receiving and grasping the second workpiece.

25. The apparatus of claim 24, and further comprising second locking means for holding said second collet against movement relative to said ball member.

26. The apparatus of claim 24, wherein said first and second collets are respectively movable axially relative to said housing and said ball member in response to said first and second planar surfaces being brought into contact with each other with said predetermined force to shift said first and second collets to closed conditions, respectively gripping the first and second workpieces.

27. The apparatus of claim 26, and further comprising force sensing means coupled to said second fixture means for sensing the force with which said first and second planar surfaces are urged together.

28. The apparatus of claim 21, and further comprising third fixture means disposable within said first fixture means and movable relative thereto for holding an associated third workpiece.

29. The apparatus of claim 28, and further comprising third drive means coupled to said third fixture means for effecting movement thereof along said axis relative to said first fixture means for moving the third workpiece relative to the first workpiece.

30. The apparatus of claim 29, and further comprising workpiece coupling means carried by said third fixture means for coupling to said third workpiece, said coupling means being axially movable between a seated condition coaxial with said third fixture means and an unseated condition laterally movable relative to said third fixture means, and bias means resiliently urging said coupling means to its seated condition.

31. The apparatus of claim 21, and further comprising ball locking means engageable with said ball member for preventing movement thereof relative to said socket means.

32. The apparatus of claim 21, and further comprising translational drive means coupled to said socket means for effecting movement thereof and of the second workpiece in orthogonal directions in a plane disposed substantially perpendicular to said axis.

* * * * *

UNITED STATES PATENT AND TRADEMARK OFFICE
CERTIFICATE OF CORRECTION

PATENT NO. : 5,295,700
DATED : March 22, 1994
INVENTOR(S) : Daniel F. Crews, Gregory R. O'Brien and Alan L. Stone It is certified that error appears in the above-identified patent and that said Letters Patent are hereby corrected as shown below:

Column 19, line 50, change "claim" to --claim 1--.

Column 20, line 29, change "claim 14" to --claim 11--.

Signed and Sealed this

Twentieth Day of September, 1994

Attest:

BRUCE LEHMAN

Attesting Officer      Commissioner of Patents and Trademarks